US007905780B2

(12) United States Patent
Morrow et al.

(10) Patent No.: US 7,905,780 B2
(45) Date of Patent: *Mar. 15, 2011

(54) USER INTERFACE SYSTEM AND METHOD

(75) Inventors: James W. Morrow, Sparks, NV (US); Carmen DiMichele, Sparks, NV (US)

(73) Assignee: Bally Gaming International, Inc., Las Vegas, NV (US)

( * ) Notice: Subject to any disclaimer, the term of this patent is extended or adjusted under 35 U.S.C. 154(b) by 1332 days.

This patent is subject to a terminal disclaimer.

(21) Appl. No.: 11/307,528

(22) Filed: Feb. 10, 2006

(65) Prior Publication Data

US 2007/0082737 A1 Apr. 12, 2007

Related U.S. Application Data

(63) Continuation-in-part of application No. 10/943,771, filed on Sep. 16, 2004.

(51) Int. Cl.
*A63F 13/00* (2006.01)

(52) U.S. Cl. ........................................... 463/31; 463/16

(58) Field of Classification Search .................. 463/1, 6, 463/16–18, 20, 40–42, 31–33; 345/762; 715/762

See application file for complete search history.

(56) References Cited

U.S. PATENT DOCUMENTS 3,662,105 A 5/1972 Hurst et al.
4,448,419 A 5/1984 Telnaes
4,676,506 A 6/1987 Crouch
4,718,672 A 1/1988 Okada
4,837,728 A 6/1989 Barrie et al.
5,429,361 A 7/1995 Raven et al.
5,655,961 A 8/1997 Acres et al. .................... 463/27
5,702,304 A 12/1997 Acres et al. .................... 463/29
5,741,183 A 4/1998 Acres et al. .................... 463/42
5,752,882 A 5/1998 Acres et al. .................... 463/42
5,759,102 A 6/1998 Pease et al.
5,769,716 A 6/1998 Saffari et al.

(Continued)

FOREIGN PATENT DOCUMENTS

AU 704691 4/1997

(Continued)

OTHER PUBLICATIONS

Advertisement in Gaming Products & Services/Bingo Manager Magazine, Table of Contents, vol. 5, No. 7, Jul. 1997.

*Primary Examiner* — Ronald Laneau
*Assistant Examiner* — Ross A. Williams
(74) *Attorney, Agent, or Firm* — Steptoe & Johnson LLP

(57) ABSTRACT

An embedded user interface system 10 includes a web page display screen 20 and an embedded processor 30, and is incorporated into a gaming machine 40 that in turn includes a gaming presentation 50 and a gaming processor 60. The embedded processor 30 employs an internal operating system and communicates with the gaming processor 60. The display screen 20 presents information to a user via the display screen. The dictionary extension 100 receives an incoming text string, parses the text string to identify a navigation command and pull a uniform resource locator from the text string, loads the uniform resource locator pulled from the text string into a variable, and indirectly navigates the web content capable display screen to the uniform resource locator in the variable. This provides a dramatic improvement over traditional system components 70 (input/output peripherals) that have been used in the past to access service and system information, such as a 2-line, 20-character VF display and a 12-digit keypad.

42 Claims, 15 Drawing Sheets

U.S. PATENT DOCUMENTS

| | | | | |
|---|---|---|---|---|
| 5,770,533 | A | 6/1998 | Franchi | |
| 5,779,545 | A | 7/1998 | Berg et al. | |
| 5,796,389 | A | 8/1998 | Bertram et al. | |
| 5,809,482 | A | 9/1998 | Strisower | |
| 5,816,918 | A | 10/1998 | Kelly et al. | |
| 5,820,459 | A | 10/1998 | Acres et al. | 463/25 |
| 5,833,536 | A | 11/1998 | Davids et al. | |
| 5,833,540 | A | 11/1998 | Miodunski et al. | |
| 5,836,817 | A | 11/1998 | Acres et al. | 463/26 |
| 5,851,148 | A | 12/1998 | Brune et al. | |
| 5,876,284 | A | 3/1999 | Acres et al. | |
| 5,885,158 | A | 3/1999 | Torango et al. | |
| 5,919,091 | A | 7/1999 | Bell et al. | |
| 5,967,896 | A | 10/1999 | Jorasch et al. | |
| 5,973,696 | A | 10/1999 | Agranat et al. | |
| 5,984,779 | A | 11/1999 | Bridgeman et al. | |
| 6,008,784 | A | 12/1999 | Acres et al. | |
| 6,010,404 | A | 1/2000 | Walker et al. | |
| 6,068,552 | A | 5/2000 | Walker et al. | |
| 6,071,190 | A | 6/2000 | Weiss et al. | 463/25 |
| 6,077,163 | A | 6/2000 | Walker et al. | |
| 6,110,041 | A | 8/2000 | Walker et al. | |
| 6,113,495 | A | 9/2000 | Walker et al. | |
| 6,135,884 | A | 10/2000 | Hedrick et al. | 463/20 |
| 6,162,122 | A | 12/2000 | Acres et al. | 463/29 |
| 6,244,958 | B1 | 6/2001 | Acres | 463/26 |
| 6,254,483 | B1 | 7/2001 | Acres | |
| 6,257,981 | B1 | 7/2001 | Acres et al. | |
| 6,280,328 | B1 | 8/2001 | Holch et al. | |
| 6,302,790 | B1 | 10/2001 | Brossard | |
| 6,312,333 | B1 | 11/2001 | Acres | |
| 6,319,125 | B1 | 11/2001 | Acres | |
| 6,364,768 | B1 | 4/2002 | Acres et al. | |
| 6,364,769 | B1 | 4/2002 | Weiss et al. | 463/29 |
| 6,371,852 | B1 | 4/2002 | Acres | |
| 6,375,567 | B1 | 4/2002 | Acres | 463/25 |
| 6,375,569 | B1 | 4/2002 | Acres | |
| 6,431,983 | B2 | 8/2002 | Acres | 463/25 |
| 6,457,099 | B1 | 9/2002 | Gilbert | 711/115 |
| RE37,885 | E | 10/2002 | Acres et al. | 463/42 |
| 6,565,434 | B1 | 5/2003 | Acres | |
| 6,607,441 | B1 | 8/2003 | Acres | |
| 6,652,378 | B2 | 11/2003 | Cannon et al. | |
| 6,712,697 | B2 | 3/2004 | Acres | |
| 6,712,698 | B2 | 3/2004 | Paulsen et al. | |
| 6,722,985 | B2 | 4/2004 | Criss-Puszkiewicz | |
| 6,722,986 | B1 | 4/2004 | Lyons et al. | |
| 6,800,030 | B2 | 10/2004 | Acres | |
| 6,832,958 | B2 | 12/2004 | Acres et al. | |
| 6,910,964 | B2 | 6/2005 | Acres | |
| RE38,812 | E | 10/2005 | Acres et al. | |
| D531,333 | S | 10/2006 | Acres et al. | |
| 2002/0111206 | A1 | 8/2002 | Van Baltz et al. | 463/17 |
| 2003/0060247 | A1 | 3/2003 | Goldberg et al. | |
| 2004/0002383 | A1 | 1/2004 | Lundy et al. | |
| 2004/0100490 | A1 | 5/2004 | Boston et al. | |
| 2004/0142750 | A1 | 7/2004 | Glisson et al. | |

FOREIGN PATENT DOCUMENTS

| | | | |
|---|---|---|---|
| EP | 0769769 | A1 | 4/1997 |
| WO | 2004/024260 | | 3/2004 |

USER INTERFACE SYSTEM AND METHOD

RELATED APPLICATION

This application is a continuation-in-part of U.S. patent application Ser. No. 10/943,771 filed Sep. 16, 2004, entitled USER INTERFACE SYSTEM AND METHOD FOR A GAMING MACHINE, which is hereby incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates generally to a gaming system that incorporates an additional user interface, and more particularly, to a system and methodology that integrates an embedded additional user interface having an animation capable display screen into a gaming machine.

BACKGROUND OF THE INVENTION

Traditionally, gaming machines have been designed for gaming purposes only. In this regard, gaming machines have been constructed only to include gaming functionality. Recently, however, casino owners have become aware that by adding additional features to gaming machines, they may be able to maintain a player's attention to the gaming machines for longer periods of time. This, in turn, leads to the player wagering at the gaming machine for longer periods of time, thereby increasing casino profits.

One technique that has been employed to maintain a player's attention at the gaming machine has been to provide players with access to gambling-related information. By attaching a small electronic display to the gaming device, gambling-related information, as well as news and advertisements can be sent to the player. The gambling-related information may include, for example, information on sports betting and betting options for those sporting events. Additionally, the gambling-related information may also include information such as horse racing and off-track betting. News and advertisements can also maintain a player's attention by providing the player with access to information ranging from show times, to restaurant and hotel specials, and to world events, thus reducing the need and/or desire for the player to leave the gaming machine.

Moreover, it would be desirable to provide the player with interactive access to the above information. This type of interactivity would allow players significantly more flexibility to make use of the above-described information. The gambling-related information could also be utilized by the player in a much more efficient manner. In this regard, greater levels of flexibility and access are likely to make a player remain and gamble at the gaming machine for significantly longer periods of time. Unfortunately, the system components that are currently utilized for displaying and accessing this type of information, such as external keypads and display modules, are extremely limited in the functionality and capabilities that they provide, thus limiting the success of their ability to maintain a player's attention.

As stated above, attempts to distribute gambling-related information and advertisements to players, has typically required additional system components to be attached to the gaming devices separately and apart from the construction of the gaming machine itself. Specifically, these components for accessing and displaying information from gaming machines have been extremely limited in their usefulness because of the lack of capabilities inherent in these components. Such components have generally included a keypad, card reader, and display equipment, such as a 2-line LED display. It would be desirable for these components to be integrated into the gaming device itself, in a more unified fashion to provide substantially greater functionality than that which has been previously available.

Accordingly, those skilled in the art have long recognized the need for a system that is capable of integrating expanded service and systems capabilities with the more traditional function of a gaming device. The claimed invention clearly addresses these and other needs.

SUMMARY OF THE INVENTION

Briefly, and in general terms, the claimed invention resolves the above and other problems by providing an embedded user interface system associated with a gaming machine, wherein the gaming machine includes a gaming screen and a gaming processor. More particularly, the embedded user interface system includes a web content capable display screen, an embedded processor, and a dictionary extension. Preferably, the web content capable display screen presents information to a user via the display screen. The embedded processor preferably utilizes an internal operating system. Preferably, the dictionary extension receives an incoming text string, parses the text string to identify a navigation command and pull a uniform resource locator from the text string, loads the uniform resource locator pulled from the text string into a variable, and indirectly navigates the web content capable display screen to the uniform resource locator in the variable. In this manner, the web content capable display screen increases user excitement by providing a richer gaming experience.

In accordance with another aspect of a preferred embodiment, the incoming data received by the embedded additional user interface are $I^2C$ messages (or other serial communications). Preferably, the embedded processor communicates with the gaming processor, and/or other connected devices, over an $I^2C$ bus (or other serial communications bus). The web content capable display screen of the embedded additional user interface is preferably a color graphic touch screen display. Preferably, the embedded processor is at least a 32-bit processor. Further, the internal operating system of an embedded additional user interface is preferably customized to match the specific hardware to which the internal operating system attaches.

In accordance with another aspect of a preferred embodiment, the embedded processor utilizes cryptographic technology. In one preferred embodiment, a certification process is offered for authentication and non-repudiation of the web content. Preferably, the certification process provides auditability and traceability. Specifically, the certification process provides sufficient security for gaming regulators to allow casino operators to design their own content.

In accordance with another aspect of a preferred embodiment, HTML is the web protocol into which the incoming data is translated in the embedded additional user interface. In another preferred embodiment, DHTML is the web protocol into which the incoming data is translated in the embedded additional user interface. In still another preferred embodiment, XML is the web protocol into which the incoming data is translated in the embedded additional user interface. In yet another preferred embodiment, MACROMEDIA FLASH animation technology is the web protocol into which the incoming data is translated in the embedded additional user interface. In one preferred embodiment, the embedded additional user interface connects to an Ethernet-networked backbone. Further, in one preferred embodiment, the embedded additional user interface connects to a web server through an Ethernet-networked backbone.

In accordance with another preferred embodiment, an embedded user interface system used in association with a gaming machine also includes a web content capable display screen and an embedded processor, as described above. In this embodiment, the dictionary extension receives an incoming text string, parses the text string, initiates a navigation command in response to information in the parsed text string, and navigates the display screen to a uniform resource locator selected by the dictionary extension.

In accordance with still another preferred embodiment, an embedded user interface system used in association with a gaming machine includes a web page display screen and an embedded processor, as described above. Preferably, the web page display screen presents information to a user via the display screen. In this embodiment, the web page display screen is divided into a plurality of frames that are each capable of displaying a different uniform resource locator. Further, in this embodiment, the dictionary extension receives an incoming text string, parses the text string, initiates a navigation command in response to information in the parsed text string, and navigates a frame of the display screen to a uniform resource locator selected by the dictionary extension.

In accordance with yet another preferred embodiment, an embedded user interface system used in association with a gaming machine also includes a web content capable display screen and an embedded processor, as described above. In this embodiment, the dictionary extension receives an incoming text string, parses the text string, and in response to information in the parsed text string, initiates a command that launches a pop-up dialog box over a uniform resource locator presented on the display screen without altering the uniform resource locator presented on the display screen.

One preferred embodiment is directed towards a gaming machine having a gaming presentation. The gaming machine further includes a user interface having a web page display screen, a processor for controlling game play, and a dictionary extension. In this embodiment, the dictionary extension receives an incoming text string, parses the text string, initiates a navigation command in response to information in the parsed text string, and navigates the display screen to a uniform resource locator selected by the dictionary extension.

In accordance with another preferred embodiment, the claimed invention is directed towards a method for increasing user excitement relating to a gaming machine by providing a richer gaming experience via an embedded user interface system that is incorporated into the gaming machine. Preferably, the embedded user interface system includes an embedded processor, a web page display screen, and a dictionary extension. The method preferably includes: receiving an incoming text string, parsing the text string to identify a navigation command and pull a uniform resource locator from the text string, loading the uniform resource locator pulled from the text string into a variable, and indirectly navigating the web page display screen to the uniform resource locator in the variable.

In one embodiment, the web content is protected by digital signature verification using DSA (Digital Signature Algorithm) or RSA (Rivest-Shamir-Adleman) cryptographic technology. In this regard, the content is preferably protected using digital signature verification so that any unauthorized changes are easily identifiable. Of course, other suitable protection techniques may also be used in other embodiments.

Still further, one preferred embodiment utilizes a Message Authentication Code (MAC), which may be used to verify both the content integrity and the authenticity of a message. A MAC can be generated faster than using digital signature verification technology, although it is not as robust. In one preferred embodiment, the authentication technique utilized is a BKEY (electronic key) device. A BKEY is an electronic identifier that is tied to a particular individual.

Typically, in a preferred embodiment, the data is authenticatible and non-repudiatible, rather than hidden or otherwise obfuscated (encrypted). Non-repudiation is a way to guarantee that the sender of a message cannot later deny having sent the message, and that the recipient cannot deny having received the message.

In accordance with one preferred embodiment, one or more gaming machine system or embedded additional user interface components (or content) are assigned identification codes. The components are grouped together into a protected group of component bindings using cryptographic security procedures and the identification codes of the components in the bindings group. Accordingly, the bindings prevent falsification or repudiation of content entries with respect to any modifications or replacements of components or content within the bindings group.

In accordance with another aspect of a preferred embodiment, every content entry must be authenticated by being digitally signed with a Hashed Message Authorization Code that is based on the entry itself and on the individual identification codes of the components and content in the bindings group. In the same manner, every entry that attempts a replacement of any of the embedded additional user interface components or content must be authenticated by being digitally signed with a Hashed Message Authorization Code that is based on the entry itself and on the individual identification codes of the components and content in the bindings group.

Preferably, the identification codes of the embedded additional user interface components are randomly or pseudorandomly generated. In accordance with another aspect of the verification system, a Hashed Message Authorization Code key for authenticating access to the component bindings is produced using a SHA-1 hash that is generated using the individual identification codes of the components in the bindings group. Additionally, the embedded additional user interface components are secured within the component bindings using a SHA-1 hash that is generated using the individual identification codes of the components and content in the bindings group.

Other features and advantages of the claimed invention will become apparent from the following detailed description when taken in conjunction with the accompanying drawings, which illustrate by way of example, the features of the claimed invention.

DETAILED DESCRIPTION OF THE PREFERRED EMBODIMENTS

A preferred embodiment of the embedded additional user interface, constructed in accordance with the claimed invention, is directed towards the integration of an embedded additional user interface into a gaming machine to increase user excitement by providing a richer gaming experience. The embedded additional user interface provides enhanced player satisfaction and excitement, as well as improved gaming device reliability, interactivity, flexibility, security, and accountability. The user interface is sometimes referred to herein as "additional" in that the user interface is separate from the gaming screen (or other gaming presentation). Further, the user interface is sometimes referred to herein as "embedded" in that the user interface includes its own processor in some preferred embodiments of the invention. Additionally, the display screen, which is referred to herein commonly as a web content capable display screen, may also (or alternatively) be an animation capable display screen, a web page display screen, or a multimedia display screen.

Figure 1:
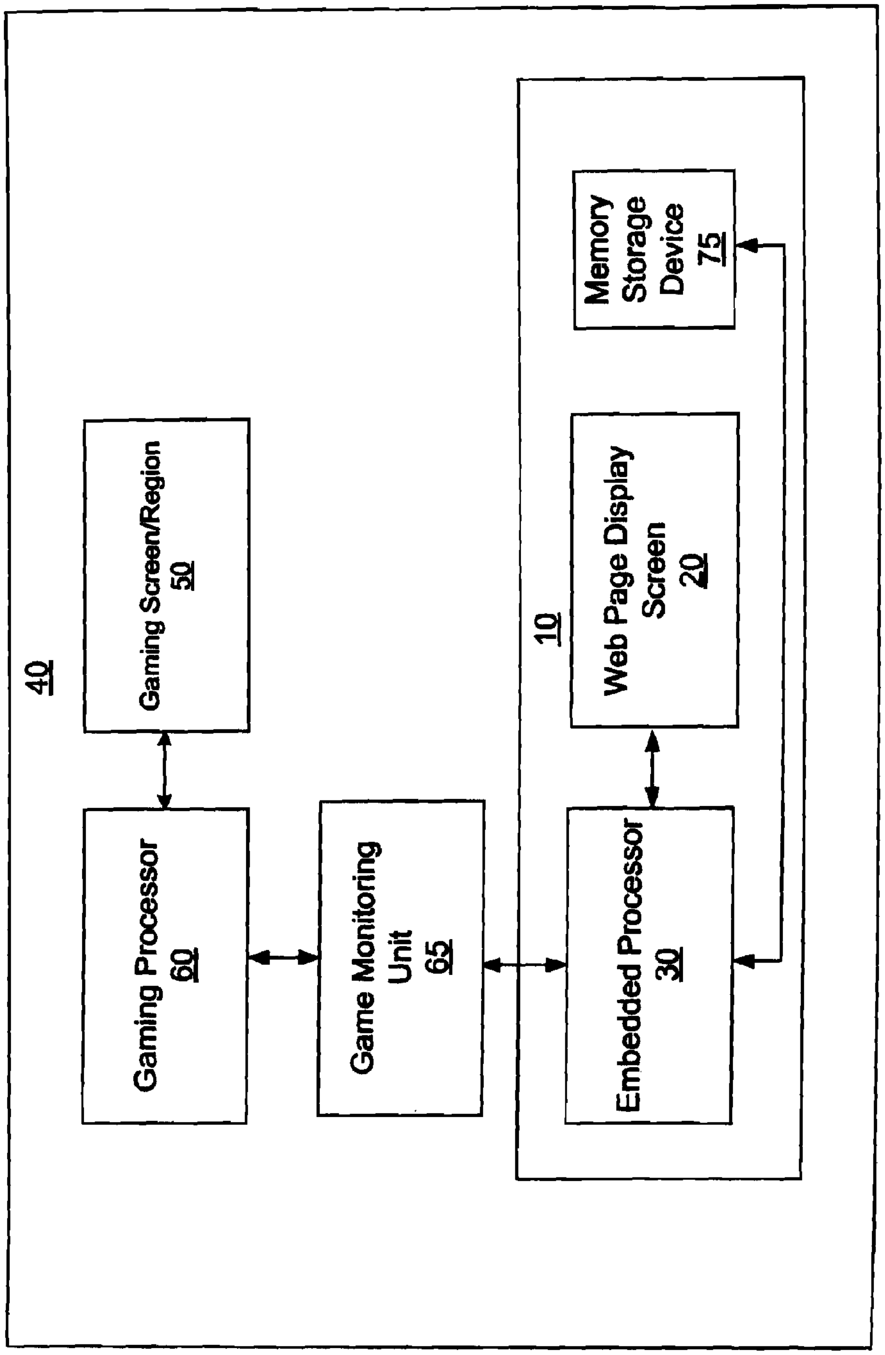
FIG. 1 illustrates a relational diagram of an embedded additional user interface, constructed in accordance with a preferred embodiment, utilizing a web page display screen and an embedded processor that receives data messages from a game monitoring unit that are translated into web page content and mapped to the web page display screen.

Referring now to the drawings, wherein like reference numerals denote like or corresponding parts throughout the drawings and, more particularly to FIGS. 1-5, there is shown one embodiment of an embedded additional user interface 10. Specifically, FIG. 1 shows an embedded additional user interface 10 that includes a web page display screen 20 and an embedded processor 30. The user interface 10 is incorporated into a gaming machine 40 that, in turn, includes a gaming screen 50, (and/or non-screen gaming region 50, e.g., spinning reels or other gaming presentation) gaming processor 60, and a game monitoring unit 65. The embedded processor 30 employs an internal operating system and communicates with the gaming processor 60, preferably via the game monitoring unit 65. The embedded processor 30 reads incoming data, translates the data into a web authoring language, and maps the data to the web page display screen 20. The display screen 20 presents web page information to a user via the display screen, thereby increasing user excitement by providing a richer gaming experience. The game monitoring unit 65 monitors the information that is input through the user interface 10. This provides a dramatic improvement over traditional system components 70 that have been used as in the past to provide user information. The user interface 10 communicates with the game monitoring unit 65 in the same manner as the previous system components 70 communicated with the game monitoring unit.

Figure 2:
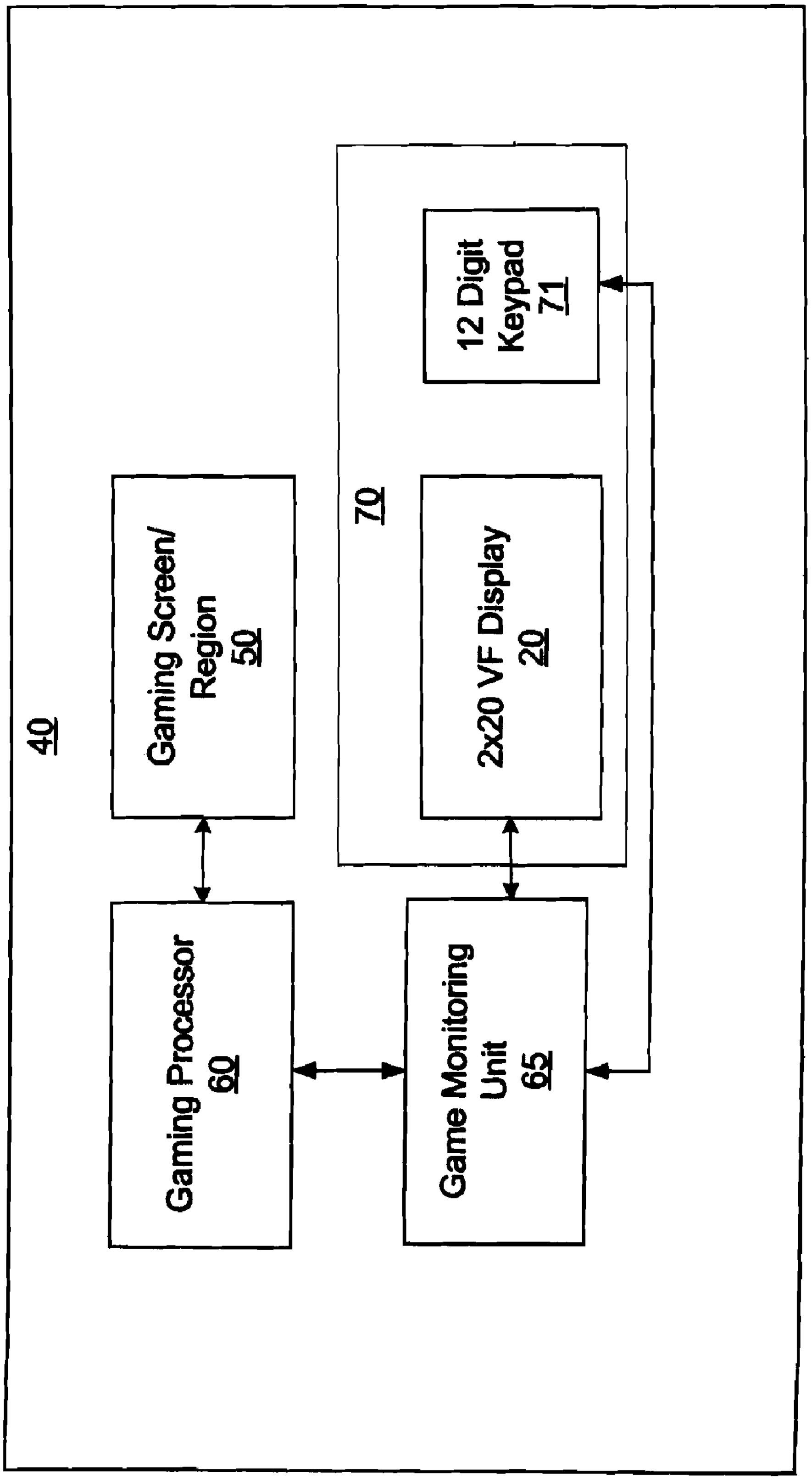
Fig. 2 (Prior Art)
FIG. 2 illustrates a relational diagram of a prior art gaming system that utilizes a 2×20 VF display and 12-digit keypad.

As shown in FIG. 2, prior art gaming devices typically utilized a single video display screen as a gaming screen 50 for the gaming machine 40, while additional system components 70 were attached or juxtaposed next to the gaming machine. The display may comprise, for example, a 2-line, 20 character VF (Vacuum Fluorescent) display 20. An input device may comprise a 12-digit keypad 71.

However, referring again to FIG. 1, in a preferred embodiment of the claimed invention, the system components 70 that were used in prior art systems are replaced with the embedded additional user interface 10 to provide the advanced functionality of a web page display screen 20. Such functionality includes, by way of example only, and not by way of limitation, the ability to display animation, multimedia, and other web-type content. The embedded additional user interface 10 enables presentation of additional information (e.g., enhanced player information) to a player (or potential player) through the web page display screen 20 in an exciting, eye-catching format, while not interfering with the normal gaming processes being displayed on the gaming screen 50. Further, the embedded additional user interface 10 does not interfere with the normal gaming hardware in the gaming machine 40, but rather is easily integrated into a gaming machine 40.

In situations involving multiple gaming machine (or gaming component) manufacturers, an embedded additional user interface 10 can be incorporated into a gaming machine (either originally or by retrofitting) without requiring access to the game logic or other gaming systems that might be proprietary and inaccessible with a gaming machine from another gaming manufacturer. Thus, in a preferred embodiment of the claimed invention, the embedded additional user interface 10, which includes a web page display screen 20 for presenting supplementary information to a player, is incorporated into a gaming machine 40 in addition to the standard gaming screen 50 typically found in a gaming machine. The embedded additional user interface 10 may also be incorporated into a gaming machine 40 that utilizes a gaming region (e.g., a reel-spinner) instead of a standard gaming screen 50. This supplemental information may include general gaming information, player-specific information, player excitement and interest captivation content, advertising content (targeted or otherwise), and the like. Further, in other preferred embodiments, the embedded additional user interface 10 may have the ability to interact with the game logic of the gaming processor 60, preferably via the game monitoring unit 65, and thus, provide further functionality, such as bonus games, system games, and/or the ability to incorporate awards, promotional offers, or gifts from the web page display screen 20 to the gaming screen 50. Moreover, the web page display screen 20 may display supplemental information in an "attract mode" when there is no game play occurring. Also the gaming processor 60 may use the web page display screen 20 to present casino employees with a web-based dialogue to facilitate gaming machine configuration and event investigation activities without disturbing the gaming screen/region 50.

In a preferred embodiment of the claimed invention, the embedded additional user interface 10 is used to make casino services more accessible and friendly to casino patrons. In one preferred embodiment, the embedded additional user interface 10 is designed to interface with the hardware configuration of game platforms currently employed in an existing gaming communication systems network, thus decreasing implementation costs for the casino. A standard gaming network interface to the systems network, such as a Mastercom system, includes a multi-drop bus method of communicating to a keypad and display. The Mastercom system is available from Bally Manufacturing, and is described in U.S. Pat. No. 5,429,361 to Raven et al. incorporated herein by reference. One such currently utilized bus is an EPI (Enhanced Player Interface), which uses an industry standard $I^2C$ bus and signaling.

In one preferred embodiment, the embedded additional user interface 10 is used to replace/upgrade an EPI. Preferably, the embedded additional user interface 10 replaces the EPI of the gaming machine in a "plug and play" manner. In other words, the old EPI can be unplugged and the new embedded additional user interface 10 can simply be plugged into the $I^2C$ bus of the game monitoring unit 65 in the gaming machine 40. The user interface 10 utilizes the currently employed industry standard $I^2C$ bus and signaling without requiring any further modification. The embedded processor 30 of the embedded additional user interface 10 reads incoming $I^2C$ data (content), translates the data into a web authoring language (e.g., HTML, DHTML, XML, MACROMEDIA FLASH), and maps the data to the web page display screen 20. In this manner, the previous $I^2C$ data messages, which were typically presented on a 2-line, 20 character VF display, are automatically transformed by the embedded additional user interface 10 into an attention grabbing, animated (multimedia) web page style format. This results in enhanced player satisfaction and excitement with extremely minimal retrofitting requirements.

Since, in one preferred embodiment, the embedded additional user interface 10 utilizes $I^2C$ hardware and signaling, this enables the user interface 10 to speak and understand the $I^2C$ protocol message set, and thus, communicate directly with the gaming processor 60 of the gaming machine 40 (or other similarly networked devices) in the same fashion in which the gaming processor previously communicated with the EPI. Accordingly, in a preferred embodiment of the claimed invention, the functionality of the previously utilized hardware (e.g., the EPI) can be replaced or augmented and thus substantially upgraded with the integration of the embedded additional user interface 10 into the gaming machine 40. As such, the limitations placed upon the gaming processor 50 by the low function external hardware of such system components 70 (e.g., a keypad and a 2-line, 20 character VF display) may be eliminated.

As stated above, in one preferred embodiment, the incoming data received by the embedded additional user interface 10 is $I^2C$ signaling protocol; however, in other preferred embodiments other serial communication protocols (or electronic communication format) may be utilized. Preferably, the embedded processor 30 communicates with the gaming processor 60 via the game monitoring unit 65, and/or other connected devices, over an $I^2C$ bus (or over another serial communications bus in embodiments that utilize another protocol). The web page display screen 20 of the embedded additional user interface 10 is preferably a color-graphic touch screen display. Preferably, the embedded processor 30 is at least a 32-bit processor. A preferred embodiment utilizes a 32-bit processor because cryptographic techniques, such as SHA-1 (or better) and DSA algorithms, are written and operate natively on a 32-bit system. Additionally, the MICROSOFT® WINDOWS® environment, which is utilized in some preferred embodiments of the claimed invention, is also 32-bit. Further, the internal operating system of the embedded additional user interface 10 may be adapted or customized to match the specific communication bus hardware used by the devices in the gaming machine 40 to which the internal operating system communicates.

Preferably, the embedded additional user interface 10 is an embedded computer board that, in addition to the embedded processor 30 and the web page display screen 20, further includes a removable COMPACT FLASH card 75 (or other memory storage device), as shown in FIG. 1, and a network adapter port. Content and feature updates to the embedded additional user interface 10 are accomplished by physically swapping out the COMPACT FLASH card 75 (or other memory storage device). Thus, in order to retrieve data from the embedded additional user interface 10, the data is accessed by physically removing and reading the COMPACT FLASH card 75. In other embodiments, as described below, updates may be provided by direct or peer-to-peer downloading over a network.

In one preferred embodiment, the internal operating system utilized by the embedded processor 30 of the embedded additional user interface 10 is WINDOWS® CE version 4.2 (or higher). Preferably, the embedded additional user interface 10 is built upon a PXA255-based board developed by the Kontron Corporation. Additionally, in a preferred embodiment of the embedded additional user interface 10, the browser control for the web page display screen 20 is MICROSOFT® INTERNET EXPLORER® 6.0 (or higher), which is shipped standard with WINDOWS® CE 4.2, the preferred internal operating system for the embedded processor 30.

A preferred embodiment of the embedded additional user interface 10 also provides a mechanism for inputting system information into, and retrieving system information from, the game machine 40. As stated above, the embedded additional user interface 10 preferably uses industry standard $I^2C$ hardware and signaling. The $I^2C$ protocol has multi-master capabilities, i.e., is capable of participating as both a slave and as a master. The embedded additional user interface 10 enables system information (such as information input by a player into a web page display screen 20) to be sent from the game machine 40 to a slot system network (or to another destination location). Likewise, the embedded additional user interface 10 also enables the system information (such as display messages) to be sent from the systems network (or from another source location) to the game machine 40 for viewing by the player through the web page display screen 20.

In a preferred embodiment, information can also be input by a user into the web page display screen 20 of the user interface 10. The web page display screen 20 of the user interface 10 employs a virtual keypad. Further, the user interface 10 uses a keypad dictionary that allows a user to be able to enter a vastly greater amount of information than was previously possible using a 12-digit VF keypad. For example, the virtual key on the touch screen that is displayed by the browser is pressed by a user. This calls the Keypad object by calling its Dispatch interface with a string that identifies which virtual key was pressed. The Keypad object looks up the string in the Dictionary object which has been loaded at initialization time with a set of keys to return when that string is passed to it. When it retrieves this set of zero or more key characters, it passes them to the GMU by calling the interface exposed by the object.

Typically, a network interface (or equivalent system) is used to control the flow of funds used with the gaming machine 40 within a particular casino. By utilizing the embedded additional user interface 10 of the claimed invention, the gaming network interface can be instructed to move funds between players' accounts and gaming devices by merely touching the web page display screen 20. In addition, many other more sophisticated commands and instructions may be provided. Thus, the embedded additional user interface 10 improves the player and casino employee interface to the gaming machine 40, directly at the gaming device itself.

In a preferred embodiment of the claimed invention, the web page display screen 20 of the embedded additional user interface 10 enables a player to be shown player messages in an animated, multimedia, web content style environment. These messages would previously have been displayed in a significantly more mundane format on a separate display device (e.g., a 2-line VF display device). In some preferred embodiments, touch screen buttons in the web page display screen 20 are used by the player to navigate between windows in web page display screen 20 and allow access to system functions such as cashless withdraw, balance requests, system requests, points redemption, and the like. In other preferred embodiments of the claimed invention, the web page display screen 20 utilizes various other data input techniques commonly known in the art, instead of the touch screen data entry. Thus, implementation of the embedded additional user interface 10 is an efficient, highly beneficial, and substantial upgrade to a gaming machine 40 that greatly increases the functionality over what was previously possible using an EPI.

In one preferred embodiment, text data messages are translated into web page navigation requests by the embedded processor 30 and then displayed on the web page display screen 20 as shown and discussed with respect to FIGS. 6A and 6B below. Script languages, such as JAVA SCRIPT and VB SCRIPT, are also utilized for some of the web pages. Preferably, the embedded additional user interface 10 emulates the 12-digit keypad and the 2×20 VF display on the web page display screen 20, which has touch screen capabilities. In this embodiment, commands that were previously displayed on the 2×20 VF display are matched to a corresponding URL and a browser is used to render the page on the web page display screen 20. The web pages displayed contain touch-screen keys that effectively emulate hardware keys.

Figure 6A:
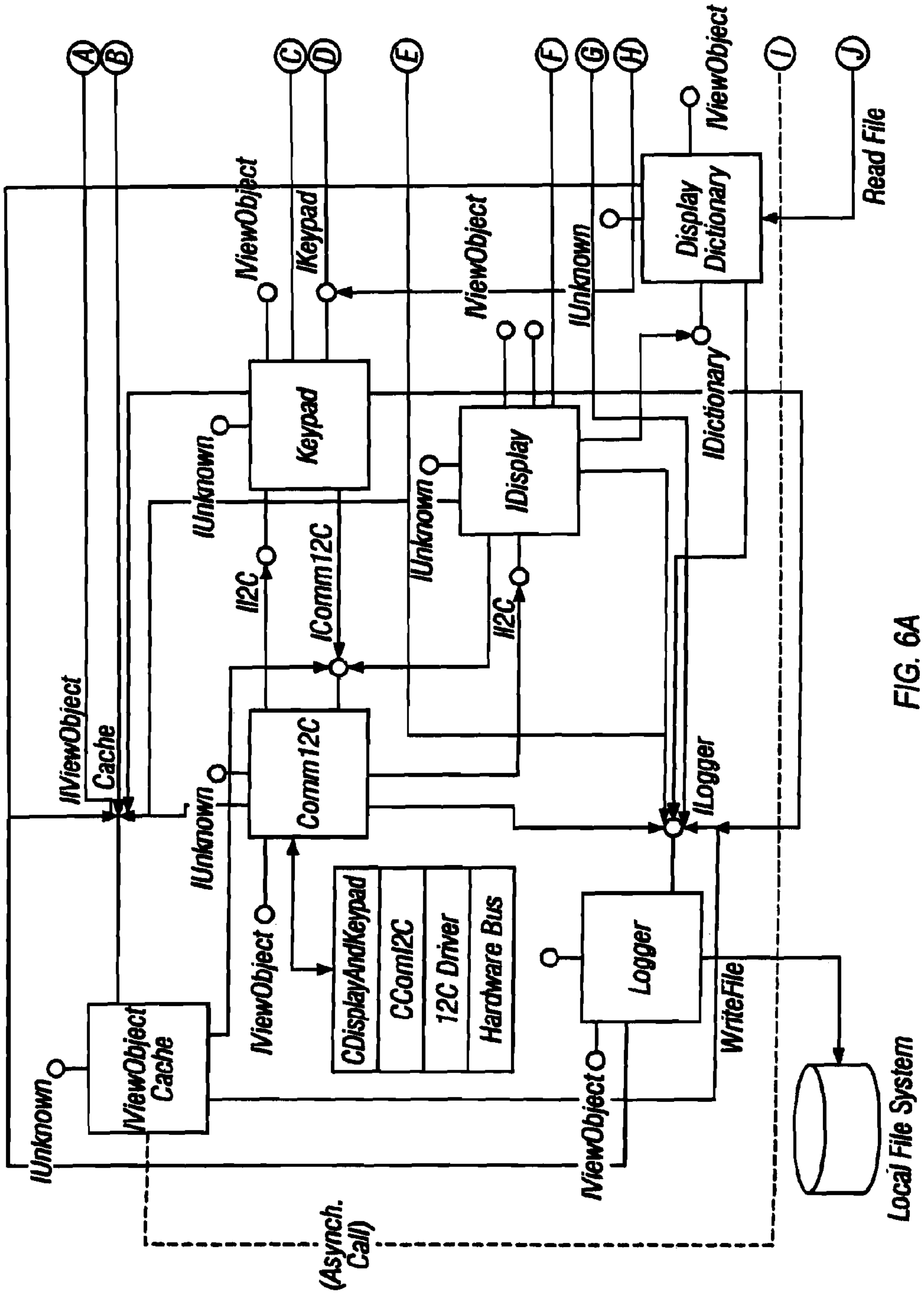
FIGS. 6A and 6B illustrate an object interaction diagram of embedded additional user interface, constructed in accordance with a preferred embodiment.
Figure 6B:
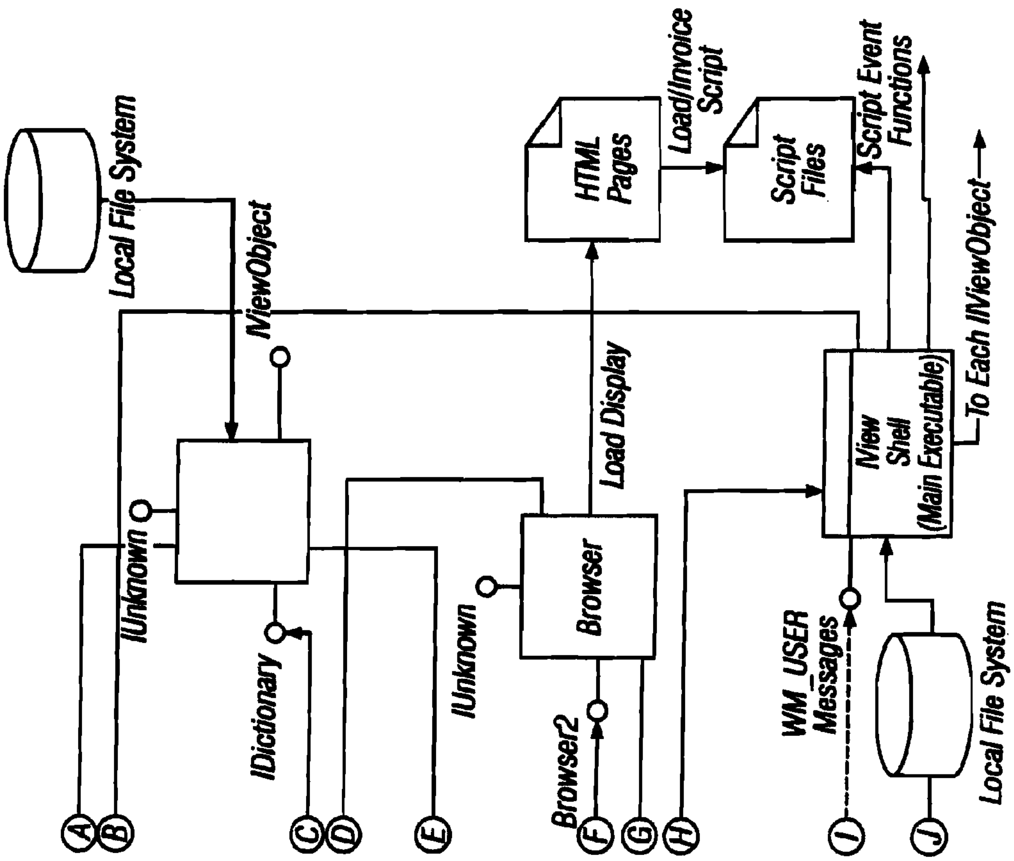
Figure 7:
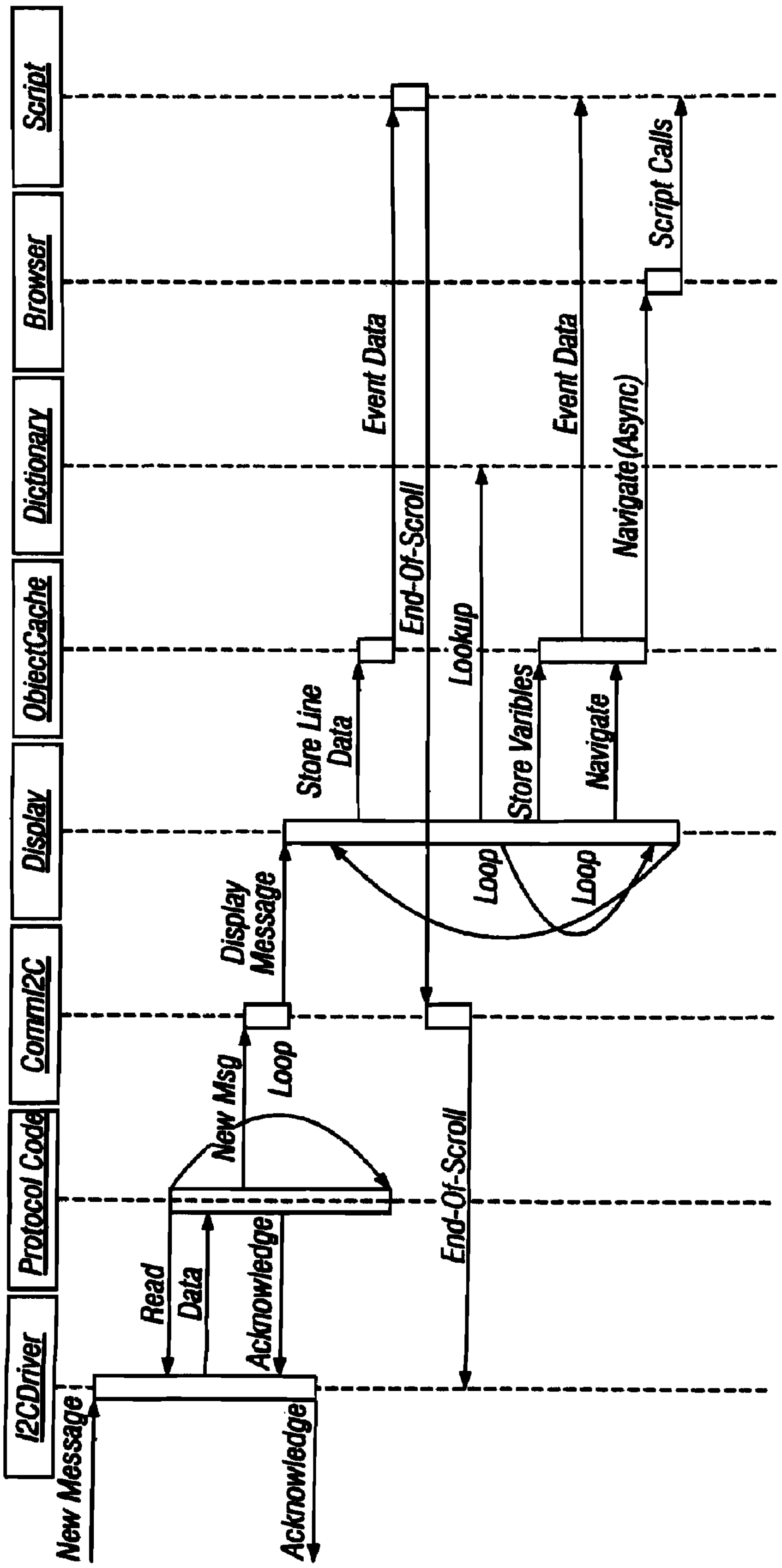
FIG. 7 is a diagram showing the sequence of events that occur when data is sent between the embedded additional user interface and the game monitoring unit.

With reference to FIGS. 6A and 6B, in one preferred embodiment of the claimed invention, a dictionary URL approach is used for translating the data messages into web page information. In this manner, data messages are "looked up" in a dictionary data file where they can be redirected to an attractive URL. The embedded processor 30 responds to requests on the $I^2C$ bus that were intended for the prior art enhanced player interface (EPI) VF display. The web page display screen 20 is not a passive display device like traditional PC monitors, but rather the display screen 20 must respond to commands with text type responses. These requests include initialization requests, status requests, and display requests. With reference to FIG. 7, as each text data message to be displayed is passed into the embedded processor 30, the processor 30 calls a URL Dictionary to look up a URL with which to replace the text data message. Once the substitution is complete, the embedded processor 30 instructs the web page display screen 20 to present (or navigate to) the appropriate web page.

Figure 8:
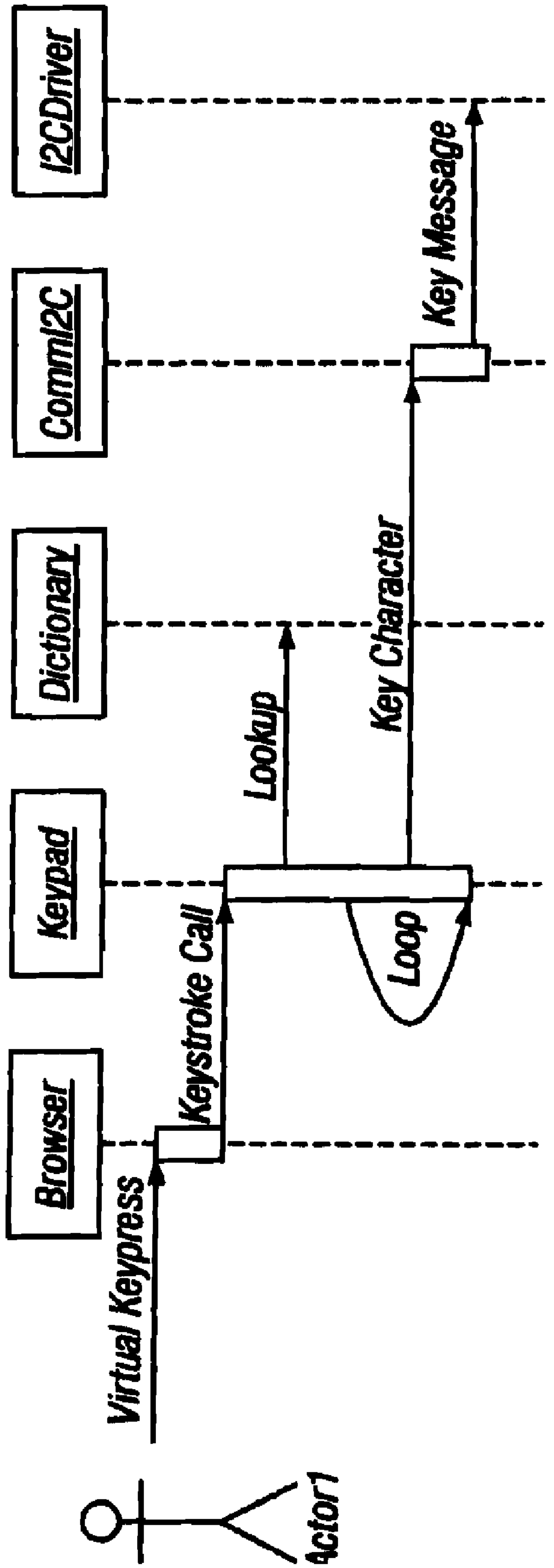
FIG. 8 is a diagram showing the sequence of events that occur when a virtual key is press on the web page display screen.

Accordingly, with reference to FIG. 8, a URL Dictionary component is used to map a text string, sent from the embedded processor 30 and intended for the display on the 2×20 VF display, to a URL that can be used to display a much more visually enhanced graphical representation of the same message. Thus, the URL Dictionary component contains a listing of the possible text messages to be supported that could be sent from the embedded processor 30, and a mapping to a set of the desired eye-catching, web content to be displayed on the web page display screen 20. In this event that a message is not in the URL Dictionary, such a message is mapping to a page that substitutes for the 2-line mode.

In the preferred embodiments described above, the embedded processor 30 of the embedded additional user interface 10 reads incoming $I^2C$ data messages, translates the $I^2C$ data messages into a web authoring language (e.g., HTML, DHTML, XML, MACROMEDIA FLASH), and maps the newly translated web page data message to the web page display screen 20. Additionally, the embedded additional user interface 10 can also read incoming data messages that are already in a web authoring language (e.g., HTML, DHTML, XML, MACROMEDIA FLASH), and map this web page data to the web page display screen 20. Further, and highly advantageously, a preferred embodiment of the claimed invention also allows casinos that are using the embedded additional user interface 10 to design and use their own content, thereby giving the casinos the ability to decide what the web page presented on the web page display screen 20 of the user interface 10 will look like.

Figure 3:
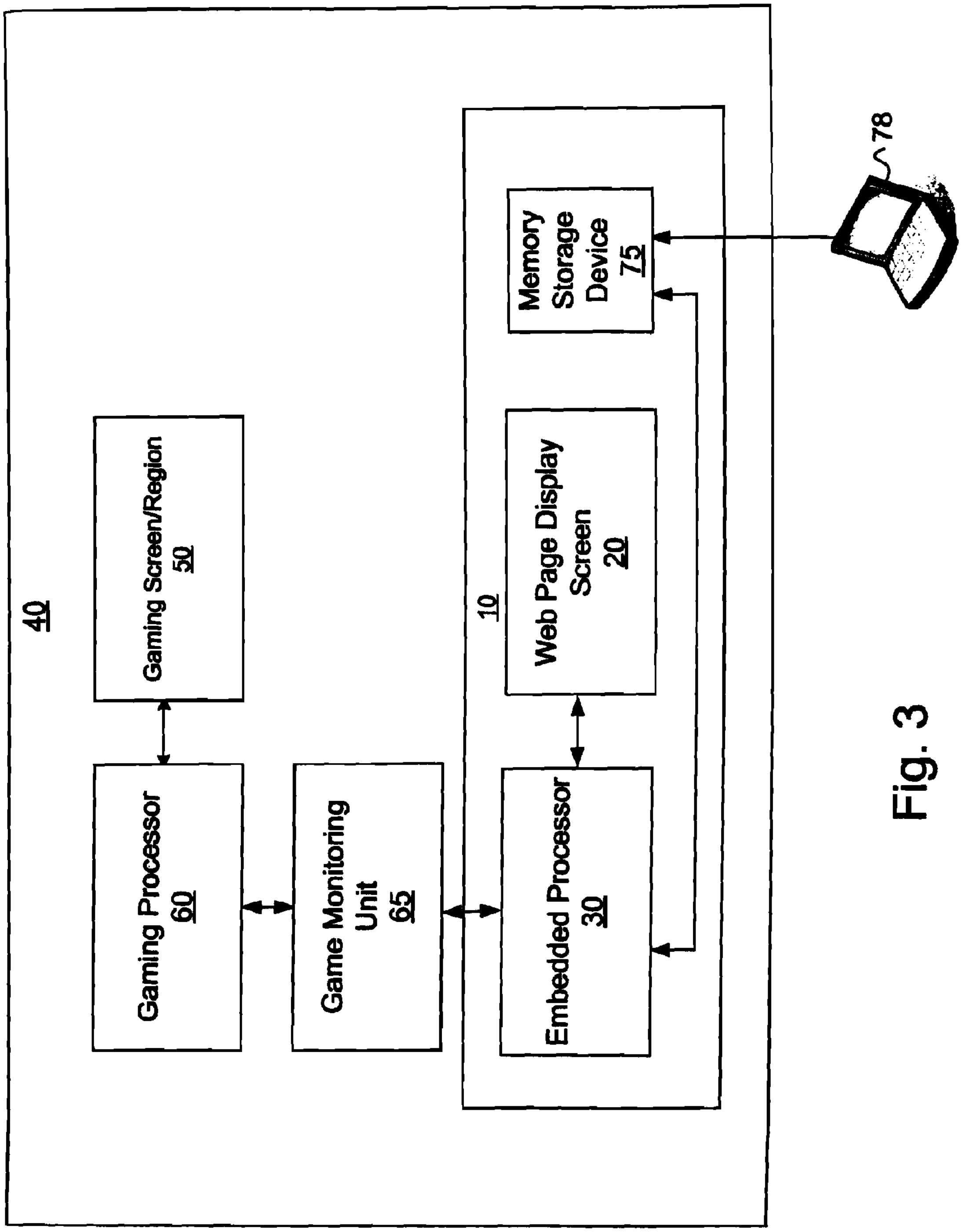
FIG. 3 illustrates a relational diagram of embedded additional user interface, constructed in accordance with a preferred embodiment, utilizing a web page display screen and an embedded processor that receives cryptographically certified web page content from a portable computer via a network adapter port.

Referring now to FIG. 3, in this preferred embodiment, content may be locally downloaded. Specifically, in one preferred embodiment, the content is updated through a physical USB (or other connection) that is used to download the new content. In one preferred embodiment, the data on the COMPACT FLASH card 75 can be accessed by connecting a separate computer 78 to the network adapter port of the embedded additional user interface 10. This embodiment allows updating the contents of the operating system, changing the operating system itself, and receiving data from the COMPACT FLASH card 75. Physical removal of the COM- PACT FLASH card 75 is also still be an option for update and inspection of files on the embedded additional user interface 10.

In one preferred embodiment, a portable computer is used to store and publish data content to the COMPACT FLASH card 75 on the embedded additional user interface 10, as well as to receiving data from the COMPACT FLASH card 75 on the embedded additional user interface. In this embodiment, all content on the embedded additional user interface 10 is authenticated as if it were a gaming machine.

In another preferred embodiment, a network adapter port is run on the embedded computer board of the user interface 10. This embodiment also includes a boot loader. Further, in this embodiment, the portable computer 78 (described above) includes components for use in uploading data to, and downloading data from, the COMPACT FLASH card 75 on the embedded additional user interface 10. Specifically, the components that run on the portable computer 78 are for moving new data content to the embedded additional user interface 10, and for validation and verification of the data content that is on the embedded additional user interface. Preferably, all data that is used to update the COMPACT FLASH card 75 moves to or from the embedded additional user interface 10 over the single built in network adapter port on the board.

Prior to the advent of the embedded additional user interface 10 of the claimed invention, gaming regulators would have been unwilling to allow casino operators to design their own content. However, due to the cryptographic technology implemented by the embedded processor 30 in the embedded additional user interface 10, a certification process is provided by the claimed invention with sufficient security for gaming regulators to allow casino operators to design their own content. Specifically, in one preferred embodiment, the certification process offered ensures authentication and non-repudiation of the casino operator designed web content. Preferably, in the claimed invention the certification process provided further ensures auditability and traceability. Various cryptographic technologies, such as authentication and non-repudiation (described herein below), are utilized in preferred embodiments of the claimed invention, to provide sufficient security for gaming regulators to allow casino operators to design their own content.

In one preferred embodiment, this certification process is used to certify "signed content" (created by the casino owners) in the same manner that a "signed program" is certified. Preferably, PKI (Public Key Infrastructure) is utilized in the certification process. PKI is a system of digital certificates, Certificate Authorities, and other registration authorities that verify authenticity and validity. In one preferred embodiment, a "new tier" or second PKI is created that is rooted in the primary PKI and that leverages the capabilities of the certificate (e.g., a X.509 certificate) that allow for limited access. Thus, this preferred embodiment allows the attributes within the certificate are used to provide "levels" of code access and acceptance in the gaming industry.

In one embodiment, the content is protected by digital signature verification using DSA (Digital Signature Algorithm) or RSA (Rivest-Shamir-Adleman) technology. In this regard, the content is preferably protected using digital signature verification so that any unauthorized changes are easily identifiable. A digital signature is the digital equivalent of a handwritten signature in that it binds an individual's identity to a piece of information. A digital signature scheme typically consists of a signature creation algorithm and an associated verification algorithm. The digital signature creation algorithm is used to produce a digital signature. The digital signature verification algorithm is used to verify that a digital signature is authentic (i.e., that it was indeed created by the specified entity). In another embodiment, the content is protected using other suitable technology.

In one preferred embodiment, a Secure Hash Function-1 (SHA-1) is used to compute a 160-bit hash value from the data content or firmware contents. This 160-bit hash value, which is also called an abbreviated bit string, is then processed to create a signature of the game data using a one-way, private signature key technique, called Digital Signature Algorithm (DSA). The DSA uses a private key of a private key/public key pair, and randomly or pseudo-randomly generated integers, to produce a 320-bit signature of the 160-bit hash value of the data content or firmware contents. This signature is stored in the database in addition to the identification number. In other preferred embodiments, higher level Secure Hash Functions are used, such as SHA-256 or SHA-512.

In another preferred embodiment, the claimed invention utilizes a Message Authentication Code (MAC). A MAC is a specific type of message digest in which a secret key is included as part of the fingerprint. Whereas a normal digest consists of a hash (data), the MAC consists of a hash (key+data). Thus, a MAC is a bit string that is a function of both data (either plaintext or ciphertext) and a secret key. A MAC is attached to data in order to allow data authentication. Further, a MAC may be used to simultaneously verify both the data integrity and the authenticity of a message. Typically, a MAC is a one-way hash function that takes as input both a symmetric key and some data. A symmetric-key algorithm is an algorithm for cryptography that uses the same cryptographic key to encrypt and decrypt the message.

A MAC can be generated faster than using digital signature verification technology; however, a MAC is not as robust as digital signature verification technology. Thus, when speed of processing is critical the use of a MAC provides an advantage, because it can be created and stored more rapidly than digital signature verification technology.

In one preferred embodiment, the authentication technique utilized is a BKEY (electronic key) device. A BKEY is an electronic identifier that is tied to a particular individual. In this manner, any adding, accessing, or modification of content that is made using a BKEY for authentication is linked to the specific individual to which that BKEY is associated. Accordingly, an audit trail is thereby established for regulators and/or other entities that require this kind of data or system authentication.

Another preferred embodiment of the verification system utilizes "component bindings" for verification using cryptographic security. In component binding, some components come equipped with unalterable serial numbers. Additionally, components such as web content or the game cabinet may also be given another random identification number by the owner. Other components in the system, such as the CMOS memory in the motherboard, the hard drive, and the non-volatile RAM, are also issued random identification numbers. When all or some of these numbers are secured together collectively in a grouping, this protected grouping is referred to as a "binding." Each component of the machine contains its portion of the binding.

In one such preferred embodiment, every critical log entry made to the content is signed with a Hashed Message Authorization Code (HMAC) that is based on the entry itself, and on the individual binding codes. In this manner, the security produced by the bindings ensures that log entries that are made cannot be falsified or repudiated.

After the critical gaming and/or system components are selected, given individual identifiers, and combined into a protected grouping that is secured using the component "bindings," any changes to those components will then be detected, authorized, and logged. For example, content within the binding is digitally signed (SHA-1 or better) using the key derived from the bindings. This signature is verified whenever an entry is made to a component within the binding. If the signature is wrong, this security violation and the violator are noted, but typically the entry is not prohibited. In other embodiments, the entry may be prohibited as well. Thus, the component binding produces a cryptographic audit trail of the individuals making changes to any of the components within the binding.

Moreover, bindings ensure that the critical components of a gaming machine system, or the content utilized therein, that have been selected to be components within the binding have not been swapped or altered in an unauthorized manner. Preferably, bindings use unique identification numbers that are assigned to vital parts of the gaming platform including, by way of example only, and not by way of limitation, the cabinet, motherboard, specific software, non-volatile RAM card, content (data), and hard drive. These identification numbers combine in a cryptographic manner to form a "binding" that protects and virtually encloses the included components, such that no component within the binding can be modified, removed, or replaced without creating an audit trail and requiring authentication. Thus, for one of these components within the binding to be changed, appropriate authentication is required and a log file entry is made documenting the activity and the identity of the individual making the change. In one preferred embodiment, a specific level of BKEY clearance or classification is required to make specific changes.

Figure 4:
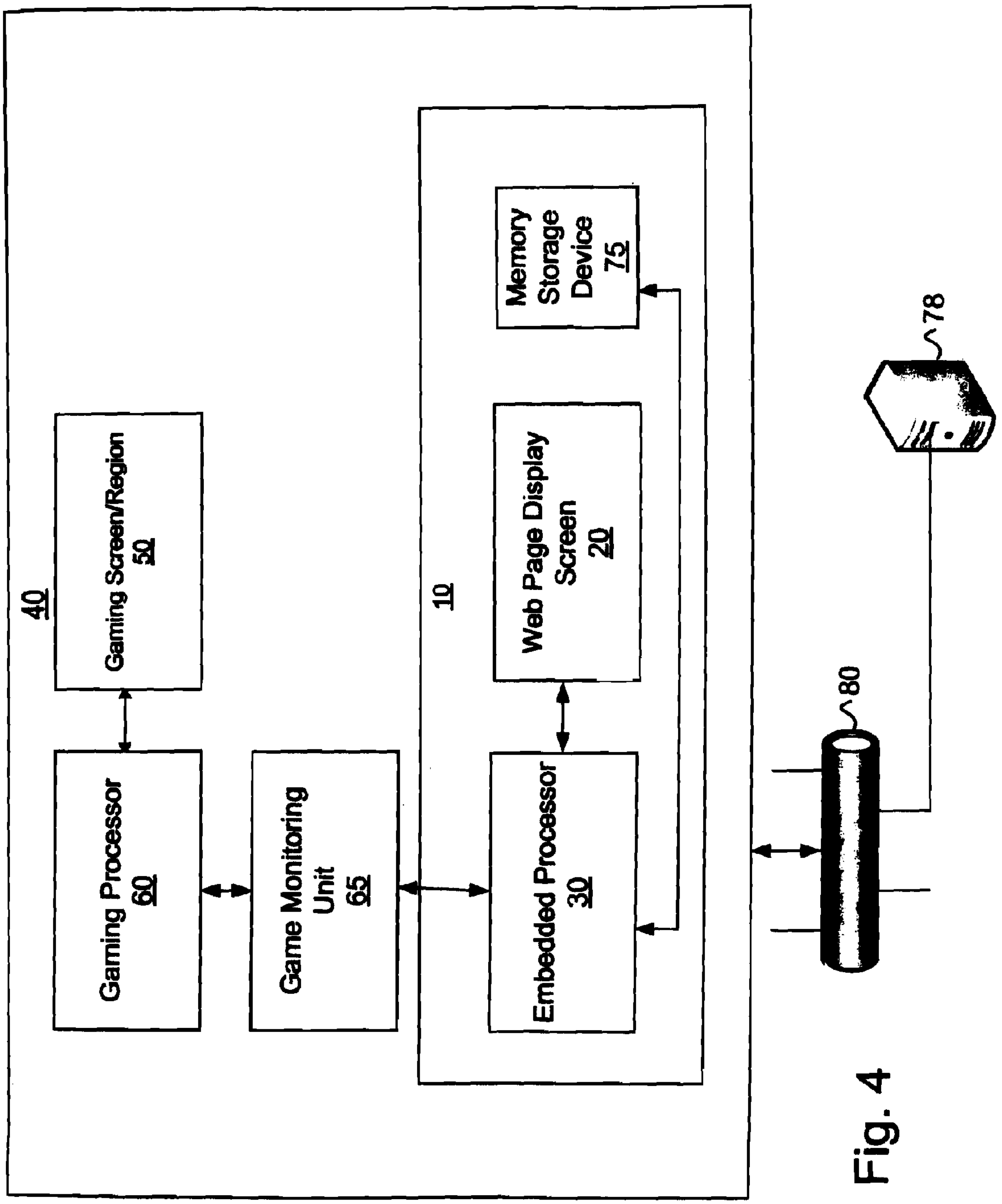
FIG. 4 illustrates a relational diagram of embedded additional user interface, constructed in accordance with a preferred embodiment, utilizing a web page display screen and an embedded processor that receives web page content from a back-end server via an Ethernet-networked backbone.

Referring now to FIG. 4, in one preferred embodiment, the embedded additional user interface 10 connects to an Ethernet-networked backbone 80 instead of a local system network. Currently, casino networks are not Ethernet, but rather are smaller, more simplistic local system networks. Thus, in this Ethernet-networked backbone 80 embodiment, the current system network is replaced by an industry standard Ethernet backbone, such as 10/100 base T Ethernet running over Cat 3, 4, 5, 6, or higher. Thus, a standard 10/100 base T Ethernet card is added to the processor in this embodiment. Preferably, the network employs TCP/IP, HTTP, and XML messaging or a variant of XML. Nevertheless any suitable protocol may be used.

Further, in another preferred embodiment, the embedded additional user interface 10 connects to a full-featured, back end, download configuration server 90 through the above-described Ethernet-networked backbone 80 as shown in FIG. 4. In such an embodiment, the full-featured server 90 can schedule downloads of content (gaming or otherwise) as well as upload information from the gaming machines 40, such as what options the gaming machines 40 currently possess. Accordingly, in a preferred embodiment, the primary use of the server 90 is as data download and data retrieval server. While this server 90 does upload and download web content style information, it is typically not connected to the World Wide Web. This server 90 must be authenticated (just like a gaming machine) to make the content served to the embedded additional user interface 10 acceptable to the gaming regulators. Preferably, utilization of the Ethernet-networked backbone 80 and the server 90 provides many system benefits, including but not limited to reliability, maintainability, security, content staging, content testing, deployment procedures, and incident recovery. In one embodiment, deliverables also preferably include content templates and guidelines for casino owners and operators to create their own web content for deployment to the web server. In one embodiment, the web server 90 has its content authenticated in the same manner as the embedded additional user interface 10 to allow content to be downloaded to the web page display screen 20.

Figure 5:
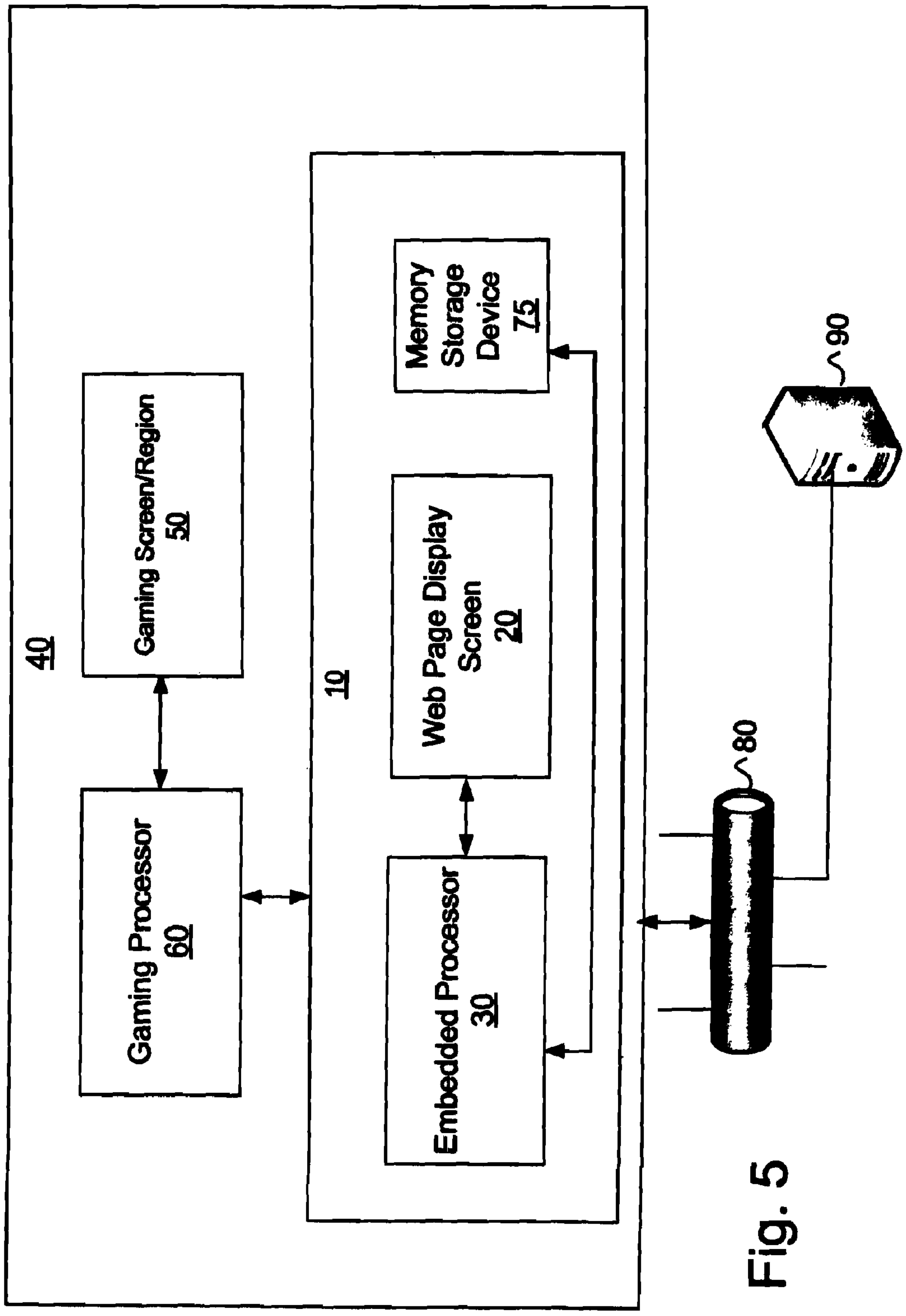
FIG. 5 illustrates a relational diagram of embedded additional user interface, constructed in accordance with a preferred embodiment, utilizing a web page display screen and an embedded processor that includes the functionality of a standard gaming processor.

Referring now to FIG. 5, in another preferred embodiment of the claimed invention, the functions previously performed by the gaming monitoring unit 65, as shown in FIGS. 1-4, of the gaming machine 40 are supported by the embedded processor 30 of the embedded additional user interface 10. Otherwise stated, the GMU code is transitioned from the gaming monitoring unit 65 into the embedded processor 30 in the embedded additional user interface 10. Accordingly, such a configuration removes the need for the gaming monitoring unit 65 in the gaming machine 40. This results in a significant reduction in the amount and complexity of the hardware, as well as completing a phased transition of more traditional style gaming machines into more modernized upgraded gaming machines.

Thus, in such a preferred embodiment, the claimed invention is directed towards an embedded additional user interface 10 that is incorporated into a gaming machine 30, the gaming machine in turn including a gaming screen 50 or other appropriate gaming region (e.g., spinning reels), but does not include a gaming monitoring unit 65. Such an embedded additional user interface 10 still includes a web content capable display screen 20 and an embedded processor 30. Once again, the web content capable display screen 20 presents web information to a user via the display screen. The embedded processor 30 preferably utilizes an internal operating system. Furthermore, in this embodiment the embedded processor 30 additionally includes standard gaming monitoring unit functionality (GMU code), since it replaces the gaming monitoring unit 65 in the gaming machine 40. As before, the embedded processor 30 reads incoming data, translates the data into a web protocol (web authoring language), if necessary, and maps the data to the web content capable display screen 20.

In one embodiment, the embedded additional user interface 10, the messages are flashed (e.g., animation, multimedia, and the like) to the player within the web page display screen 20 while the gaming screen 50 is used for game play. These web page style messages can be set at virtually any desired length, format, or style. A message might display, for example, "Welcome to Harrah's Las Vegas! You have 1200 bonus points. Would you like to make a hotel or dinner reservation?" Importantly, while a previous utilized EPI would only been capable of scrolling this message in one-quarter inch (0.25") tall monochrome text, in contrast, the web page display screen 20 would "flash" this message in bright red, white, black, and green animated format, on six inch (6.0") by three inch (3.0") color graphic display. Additionally, in some embodiments, inserting a player identification card into a card reader and/or selecting a player services button activates additional player services functionality.

In one exemplary embodiment of the embedded additional user interface 10 that utilizes a card reader (or other identification technique, such as a player ID code) to recognize a particular player, the web page display screen 20 displays an eye-catching, web page-style message to that player, for example, "Welcome, Mr. Smith!" in response to identifying Mr. Smith. Preferably, the web page display screen 20 also has touch screen capabilities that include, by way of example only, and not by way of limitation, "Beverages," "Change," "Services," "Transactions," and "Return to Game." In one embodiment, each of the touch screen icon buttons, when selected, launches a new full screen display within the web page display screen 20 for the player.

For example, in one embodiment, when the "Transactions" touch screen icon button is selected, a new screen is activated that includes the web page style message, "Mr. Smith, Account Balance: Bonus Points=1200, Player Funds=$150, Available Credit=$850, Casino Matching Funds Available=$25," as well as the "Return to Game" icon button 120. As a further example, when the player selects a "Cashless Withdraw" button in another embodiment, a new screen is activated that includes a touch screen keypad and flashes the question, "How much do you want?" as well as "Enter," "Clear," and "Back" buttons. Preferably, this interface also includes an "Information" button that, when selected, launches a new screen within the web page display screen 20 that provides answers to frequently asked questions and other useful information. Moreover, the web page display screen 20 preferably also includes a "History" button that, when selected, launches a new screen within the web page display screen 20 that provides a history log of all transactions and other actions performed on that gaming machine 40.

In accordance with another preferred embodiment, the claimed invention is directed towards a method for increasing user excitement relating to a gaming machine by providing a richer gaming experience via an embedded additional user interface that is incorporated into the gaming machine. The method preferably includes: receiving a serial data message (e.g., an $I^2C$ data message) containing enhanced player information over a serial communication bus (e.g., an $I^2C$) bus in the embedded additional user interface 10; translating the data message (using the embedded processor 30) into a web authoring language; and mapping the data message to the web page display screen 20, wherein the display screen presents web page information to a user via the display screen.

The potential advantages of utilizing the embedded additional user interface 10 of the claimed invention are numerous. These potential advantages include, by way of example only, and not by way of limitation: providing animated and/or multimedia web style content; providing fonts and icons which are larger and more aesthetically appealing; providing special services to players, (e.g., multiple languages, assistance for handicapped individuals); facilitating interactive uses of the web page display screen 20; providing the ability to customize the "look and feel" of the web page display screen 20 for players and casino employees; increased player excitement and participation; and simplified replaceability and/or upgradeability from an EPI or other similar non-web page style components.

Figure 9A:
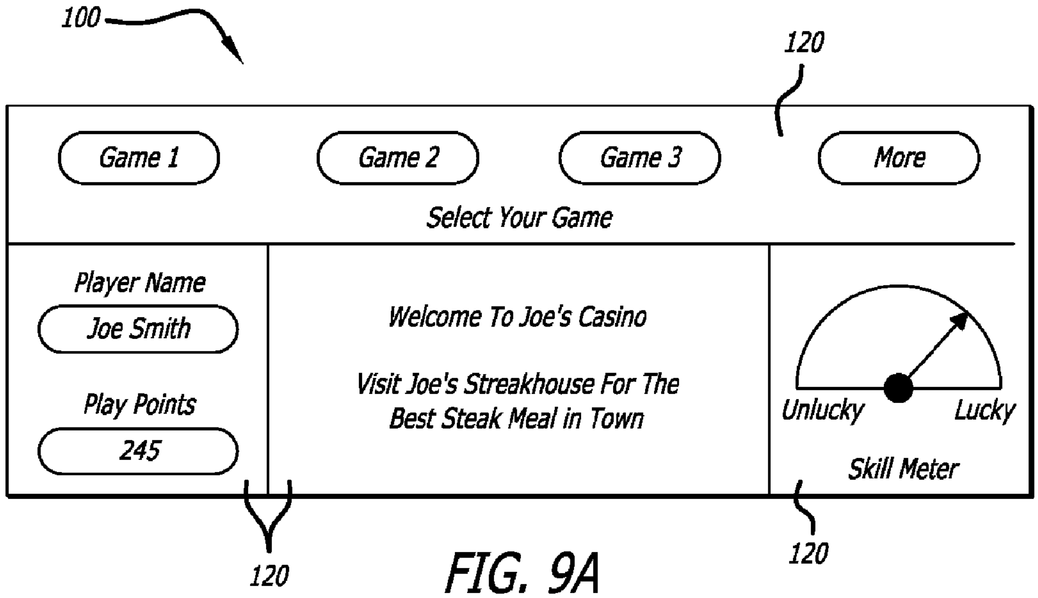
FIG. 9A is a diagram that illustrates an embedded additional user interface extension that includes a frames directive in accordance with a preferred embodiment.
Figure 9B:
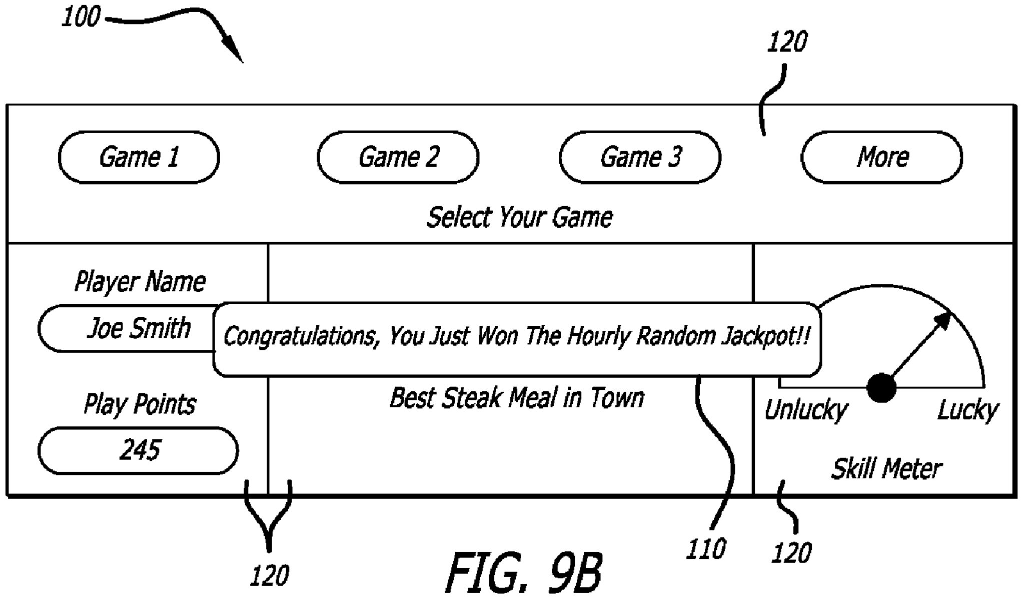
FIG. 9B is a diagram that illustrates an embedded additional user interface extension that includes a pop-up window feature in accordance with a preferred embodiment.

Referring now to FIGS. 9A and 9B, in one preferred embodiment, the embedded additional user interface 10 includes an extension 100 to the iVIEW dictionary component. Preferably, this extension 100 adds a "pop-up" window feature 110 (shown in FIG. 9B) and a "frames" directive 120 (shown in FIGS. 9A and 9B), as well as an additional "indirect" navigation mode for all navigation actions. A "pop-up" is a window that suddenly appears (pops up) in response to making a selection with a mouse, pressing a special function key, or other initiating action. A "frame" is a feature that enables a display area to be divided into two or more sections (frames). Typically, the contents of each frame are taken from different Web pages or URLs (Uniform Resource Locator).

In a preferred embodiment of the extension 100 to the iVIEW dictionary component, the "indirect" mode of the embedded additional user interface 10 enables a "navigate command" to browse to a URL that is designated as the value of a variable instead of a fixed value. Preferably, the extension 100 to the iVIEW dictionary component in the embedded additional user interface 10 supports both direct modes and indirect modes. In traditional systems, navigation actions (e.g., commanding an iVIEW-type device to browse to a URL) were hard-coded to ensure navigation to a fixed URL designation in response to some navigation-initiating event. In contrast, the "indirect" mode of the embedded additional user interface 10 enables a "navigate command" to browse to a URL that is designated as the value of a variable. This capability produces an expanded amount of flexibility and scalability than that which was previously achievable using navigation actions that were hard-coded. This is due to the fact that the navigation command can be modified by simply changing the value of the variable without altering any other part of the navigation instruction in the text string.

Accordingly, in a preferred embodiment of the iVIEW dictionary extension 100 that is in "indirect" mode, a text string is sent to the iVIEW dictionary with an embedded URL. The text string is parsed to (1) identify the event (e.g., navigation command) and (2) yank the URL from the text string. Next, the URL pulled from the text string is loaded into a variable. Finally, the browser is indirectly navigated to the URL in the variable.

In one specific non-limiting example, a text string from a back-end system states, "Hello: Please go to http://sds.net/player.html." A preferred embodiment of the (iVIEW) dictionary extension 100 retrieves this text string and parses the text string using the parsing command "Hello: Please go to \@.*\@." The (iVIEW) dictionary extension 100 knows that browser redirection is required due to the "Hello: Please go to" instruction. Furthermore, the (iVIEW) dictionary extension 100 then retrieves the value in the "\@.*\@" (a regEx expression) section of the message, puts the value into a variable "host," and performs a "NavigateIndirect" command to the variable "host value." In the same manner as described above, a set of parsing commands exist in an XML formatted file (or other acceptable protocol), that also perform these operations to multiple instances of text strings.

In other preferred embodiments, the same indirect activity of the dictionary extension 100 is used with the pop-up feature 110 and the frame directives 120. The pop-up feature 110 enables the launching of a pop-up dialogue box based on dictionary activity. In one embodiment, a user closes the pop-up dialogue box 110 by selecting a button, while in other embodiments the pop-up dialogue box is timed-out. In still another embodiment, both a button and the time out command are utilized to actuate closing of a pop-up dialogue box 110. Preferably, a pop-up dialogue box 110 enables a temporary message to be sent to the user without changing the state of the browser behind the pop-up dialogue box. Referring now to the frame directive 120 component of the embedded additional user interface 10, the frame directive provides the benefit of navigating a particular frame set in a browser page to a new URL without disturbing the rest of the browser page.

Figure 9C:
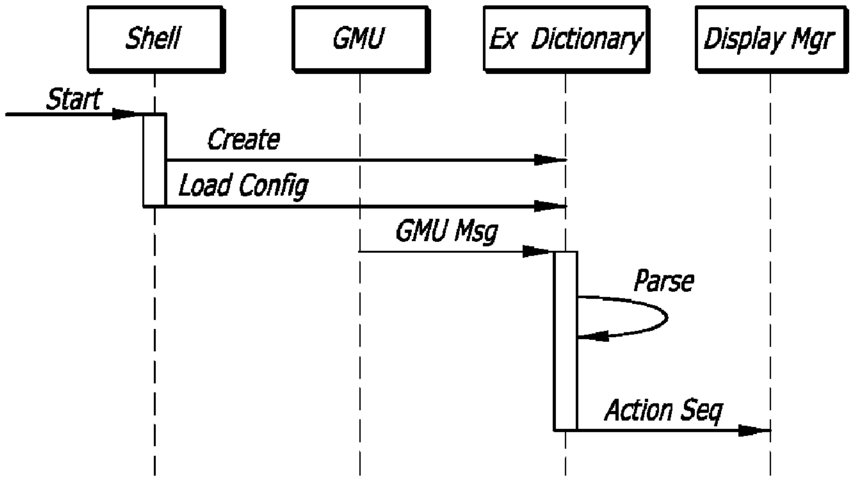
FIG. 9C is a Dictionary Sequence Diagram that illustrates a sequence in accordance with a preferred embodiment.

The extended iVIEW dictionary object is an additional dictionary that can be used in place of dictionaries previously utilized in association with an iVIEW device 10. The extended iVIEW dictionary object is matched to the GMU (Game Monitoring Unit) code. This extended dictionary object is responsible for combining the strings sent from the GMU and the XML (Extensible Markup Language) contained within the dictionary configuration file, and returning a set of actions upon which the Display Manager can act. As shown in FIG. 9C, a dictionary sequence diagram illustrates the utilization of the extended dictionary object with the GMU. In another preferred embodiment, the dictionary extension 100 of the iVIEW device 10 provides language that is easier for an average player/viewer to understand.

Additionally, in another aspect of extension 100, a screen calibration module is used to compensate for variations in screen manufacture. Typically, most screens do not require calibration; however, enabling a screen driver in the screen calibration module to calibrate screens when necessary allows any un-calibrated screens to be corrected. The screen driver saves the calibration values to a persistent storage card and copies the calibration values into the operating system registry at boot time.

Figure 10:
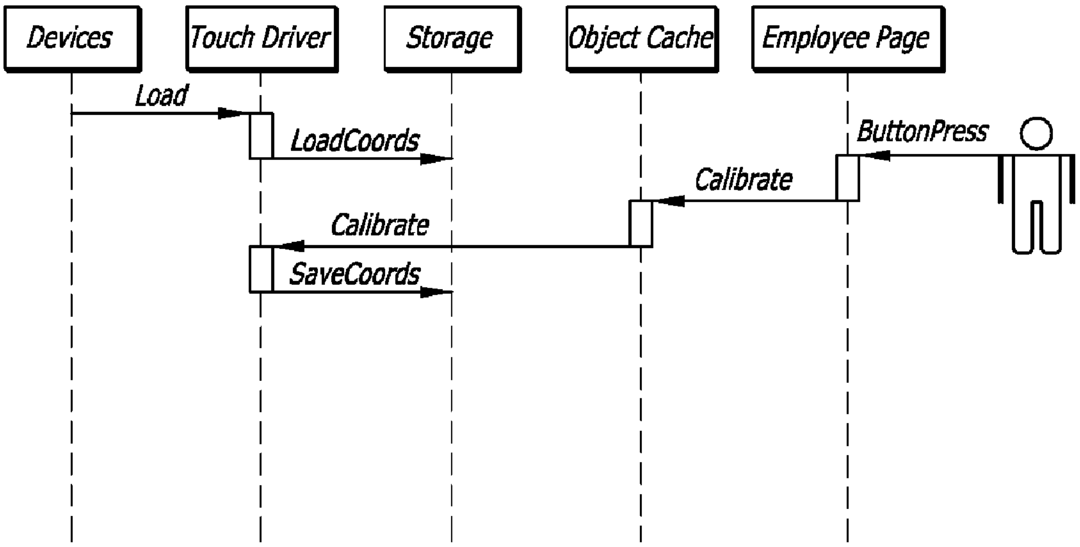
FIG. 10 is a Screen Calibration Module Sequence Diagram that illustrates a sequence in accordance with a preferred embodiment.

As shown in FIG. 10, a screen calibration module sequence diagram illustrates the utilization of the screen calibration module. With reference to the processes depicted in FIG. 10, several details should be noted. For example, in a preferred embodiment of the extension 100, the Devices object (i.e., devices.exe) is loaded at operating system boot time. This executable file loads the display and touch screen drivers. Preferably, the coordinates for the touch driver calibration are stored on a COMPACT FLASH storage card (or some other persistence storage media) rather than the registry to prevent the coordinates from being lost. In such an embodiment, this storage change requires some modifications to the driver. With respect to coordinate location storage, wherever the coordinates are stored, the coordinates are skipped by the Digital Signature Authentication, since the coordinates may change at random times. Additionally, if the coordinates are missing from the storage card, the driver use reasonable default values to prevent an error.

In a preferred embodiment of the extension 100, the application API (application program interface) provides a Boolean value to a calling program (e.g., software, hardware, firmware, and the like) that indicates whether the calibration values either have been customized for the device. To "call" is to invoke a routine in a programming language. Preferably, the calibration process initiated by the user is the built-in Windows CE® touch screen calibration code. In such an embodiment, no actual user interface calibration code is written.

In a preferred embodiment of the extension 100, the employee page utilizes a new button that initiates the calibration process. Additionally, a method can be called from script that initiates the calibration process. Preferably, the touch screen driver saves (e.g., stores) calibration values to a persistent COMPACT FLASH card (or other persistent, portable storage media). In this regard, the touch screen driver is modified to read calibration values from the COMPACT FLASH card at startup of the system. Moreover, the authentication process skips the calibration values when authenticating the data on the COMPACT FLASH card since these values may be changed at any time.

Figure 11:
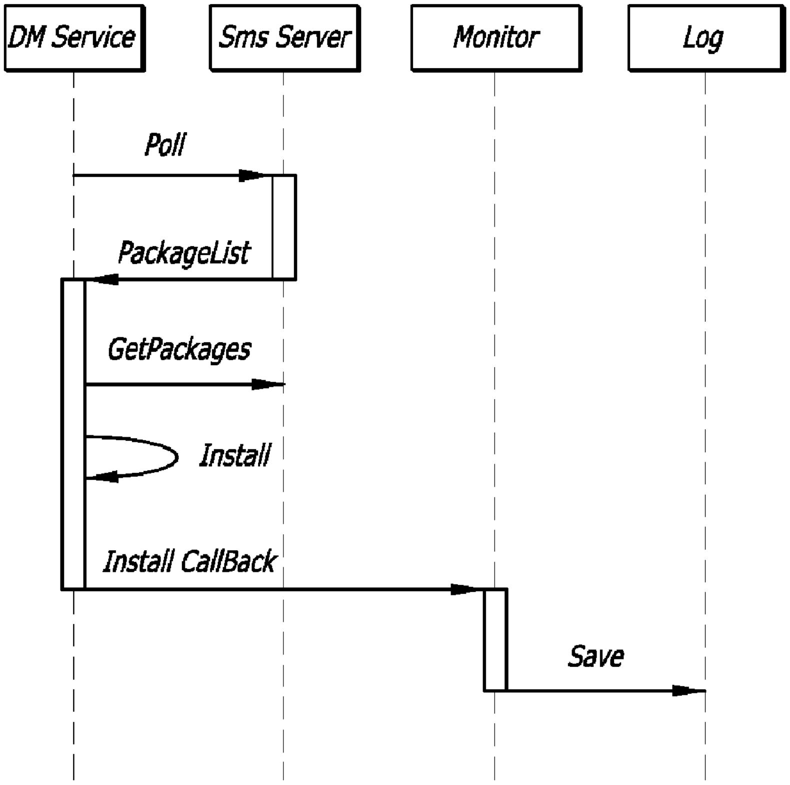
FIG. 11 is a Device Management Client Sequence Diagram that illustrates a sequence in accordance with a preferred embodiment.

As shown in FIG. 11, a device management client sequence diagram illustrates the utilization of the Device Management Client. In a preferred embodiment, the Device Management Client is the device side software component that allows SMS (Systems Management Server) Server to deploy files to the device. This object is a pre-built part of Windows CE and is included as part of the operating system build.

In a preferred embodiment, there is no operating system user interface in the iVIEW device 10. As such, a preferred embodiment of the iVIEW device 10 has several atypical attributes. For example, in one specific, non-limiting preferred embodiment, the iVIEW device 10 starts automatically at power up, uses a unique SMS (Systems Management Server) device identifier, automatically provisions itself into the SMS server, saves its set of installed SMS packages in a persistent manner that ensure they survive hard resets, identifies the existence of the SMS server as soon as possible and issues a poll to the server after the server has been identified, and instructs a Logger component to write logs that track updates.

With respect to the iVIEW device 10 automatically starting up at power up, typically the device client has a component that runs as a service and can be setup to start at boot time. With respect to the iVIEW device 10 using a unique SMS device identifier, when the device client initializes, the component is queried that supplies the device management engine with the device ID, device hardware, and state information. In one specific, non-limiting embodiment, a call is made to the GetDeviceID ( ) to obtain the Device Identifier. This function first tries to obtain the Device Identifier from a call to KernalloControl (IOCTL_HAL_GET_DEVICEID). If this procedure fails, a GUID (Globally Unique Identifier) is generated. The intent is that a call to this kernel returns the unique Device Identifier. That way a unique Device Identifier is ensured.

With respect to the iVIEW device 10 automatically provisioning itself into the SMS server, in a preferred embodiment of the iVIEW device 10 the device client has a registry entry that is setup at boot time to point to the SMS Server. Preferably, the server is an "a priori" (i.e., before experience) constant. Notably, in many embodiments there is another registry entry (which may be named EnableEditServer). Setting this registry entry false ensures that all clients point to the same server.

With respect to the iVIEW device 10 saving its set of installed SMS packages in a persistent manner that ensures they survive hard resets, the relevant module of the extension 100 communicates with a local database file to maintain state information about packages such as package ID, package name, and download status of the package. By default the database file is located in the WINDOWS directory. In one embodiment, the device client is compiled so that it uses a database file located on the COMPACT FLASH card, while in another embodiment the database file is saves from the WINDOWS directory to the COMPACT FLASH card on exit, and restore the file back to the WINDOWS directory at boot time. Notably, to save the package status, a COMPACT FLASH card (or other persistent, portable storage media) must be used. Additionally, since the contents of the COMPACT FLASH card are signed and secure, the package information is saved in a directory that is skipped by the Gatekeeper application so that the application does not interfere with the signed content.

With respect to the iVIEW device 10 identifying the existence of the SMS server as soon as possible, in a preferred embodiment the device client works in a "pull mode" (i.e., data is pulled or requested from the server by the device client) in contrast to a server "push mode" (i.e., data is pushed from the server to the device client). This "pull mode" is normally accomplished by periodically polling the server (i.e., making continuous requests for data from the server, typically at fixed time intervals). In one preferred embodiment, the iVIEW device 10 implements a "device side" listening socket. In this regard, a scan can be performed on the "server side" to find any available iVIEW devices 10. Once found, the server issues a "poll now" command that initiates an upgrade process.

Finally, with respect to the iVIEW device 10 instructing a Logger component to write logs that track updates. The device client has a component (which is a DLL) with an API that enables programmatic access to the device client. In a preferred embodiment, an API call is used to query the device client database for post installation status queries. In addition, it is our intent to implement a callback structure from the CAB file install that will allow our Monitor program to write out log file entries.

In a preferred embodiment of the iVIEW device 10, the extension 100 includes a digital signature object that implements a two step process. This process is used to verify the authenticity of the code and content on the iVIEW device 10. Preferably, the first step resides in the boot ROMs of the hardware, which uses the public key embedded in the ROM and a digital signature to verify that the executable code contained within the operating system file is authentic. In such an embodiment, the second step uses the same algorithm, but with a program embedded within the operating system that has just been authenticated. Preferably, this program is run before any other user mode executables and verifies that the content files have not been changed.

Figure 12:
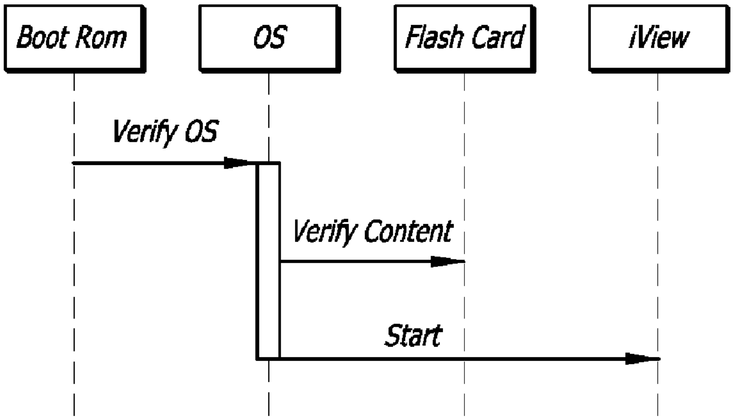
FIG. 12 is a Digital Signature Client Sequence Diagram that illustrates a sequence in accordance with a preferred embodiment.

In a preferred embodiment of the iVIEW device 10, two boot ROMs are typically utilized to support the test signing. Preferably, one boot ROM is distributed to customers and contains a public key. The other type of boot ROM contains a public key that is paired with a far less secure private key. This boot ROM is used in the development and test process to run code that has been signed with the test private key. These test boot ROMs are produced in limited quantity and protected more carefully than production boot ROMs. Moreover, one of two mechanisms must be implemented to allow customers to sign their own code. Either a customer's public key must be embedded in the operating system file (which leads to complications given the number of customers) or a third tier of authentication must be added. As shown in FIG. 12, a digital signature client sequence diagram illustrates the utilization of the Digital Signature Client.

In a preferred embodiment, the Game Monitoring Unit provides text strings to the iVIEW device 10. These strings are interpreted according to configuration files as navigation commands to HTML pages, as well as other actions. Embedded within these text strings, in an "ad hoc" manner, are variable pieces of data that can be formatted into the HTML (Hyper Text Markup Language) pages using DHTML (Dynamic Hyper Text Markup Language) and script to provide personalization and other functionality. The iVIEW device 10 was configured to avoid modifying the legacy GMU as much as possible, since originally, the strings in the GMU design were only intended to display on a two line device before the advent of the iVIEW device 10.

The strings are transmitted to the GMU using an EPI protocol, which is a higher level protocol implemented on top of the $I^2C$ bus. The EPI protocol provides functionality beyond that typically provided by $I^2C$. For example, long messages are broken into packets, and retry logic is included for greater reliability.

A significant challenge with the implementation of the iVIEW device 10 was that originally, GMU messages were intended for display only, while the iVIEW device 10 takes actions based on the messages (i.e., is interactive). Accordingly, in order to determine which action to take, the iVIEW device 10 must match the string with an action. Some strings, however, cannot be translated into a pattern. As such, the intent of these strings must be assumed (or guessed) based on the lack of a match. All CMS directed messages fall into this category.

At best, each unmatched message creates a performance problem because each directed message has to traverse the entire dictionary before its nature can be guessed. At worst, directed messages can cause errors (e.g., if a casino operator happened to input a directed message that matched something higher up in the dictionary). Problems can also occur as a result of ambiguous strings, such as, for example, when determining when an employee card is inserted versus when a player card is inserted. If the first string returned in both cases is the same, the iVIEW device 10 does not know which mode to enter.

These issues are resolved by extending the EPI protocol to provide additional information with each message that indicates the intent of the message (i.e., message types). The full set of additional message "types" are configured in conjunction with the protocol extension. Such message "types" include, by way of example only, and not by way of limitation: specifying if a message is a player log on message, an employee log on message, a GMU originated message, a CMS directed message, a log off message, or the like. The extension of this protocol preferably includes modifications to both the GMU and the supporting driver stack on the iVIEW device 10, as well as the implementation of a new dictionary to allow proper interpretation of the new messages.

In a preferred embodiment of the extension 100, the Digital Signing object is a .Net Assembly that is called to generate the digital signature for the content or code that is to be signed. The result of this operation is the addition of two files (i.e., the digital signature and the public key) to the repository of files that constitute the content or code which has been signed. Notably, the signature applies to the contents of the directory and all contained subdirectories. In a preferred embodiment of the extension 100, the iVIEW device 10 uses the public key and the digital signature to verify that none of the files have been changed.

Figure 13:
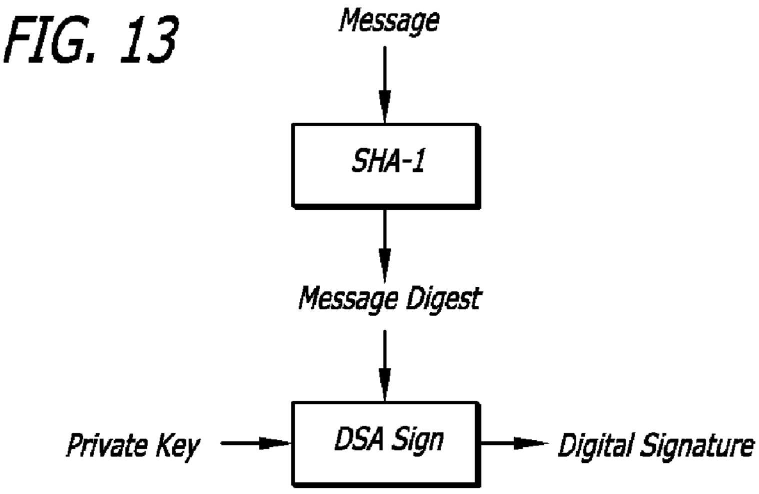
FIG. 13 is a Digital Signing Diagram that illustrates a sequence in accordance with a preferred embodiment.

Preferably, digital signature verification is the authentication scheme used to secure the iVIEW code and content, which are referred to herein as the message. The outcome of signing process is the production of a digital signature. Preferably, to generate the digital signature, the message is first transformed into the message digest using a hashing algorithm. In one preferred embodiment, the algorithm used is the Secure Hash Algorithm (SHA-1) Next, the message digest is signed, preferably using a private key and the Digital Signature Algorithm (DSA). The output of the DSA signing is the digital signature for the message. As shown in FIG. 13, a digital signing diagram illustrates the digital signing sequence.

Figure 14:
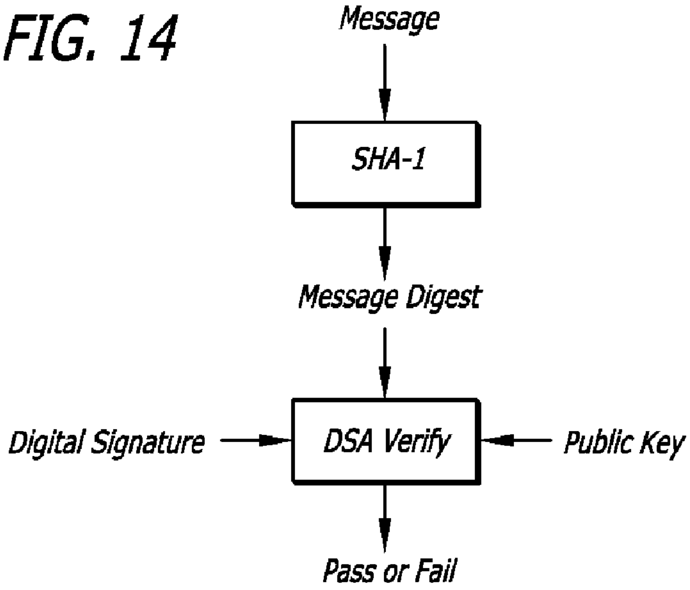
FIG. 14 is a Signature Analysis Diagram that illustrates a sequence in accordance with a preferred embodiment.

To ensure the message has not been changed or tampered with, the message is verified through analysis of its digital signature. First, the message is hashed into the message digest, preferably using SHA-1. Next, using the digital signature as well as the public key, the message digest is verified using DSA. In a preferred embodiment, the content is signed with the private key, but is verified with the public key. As shown in FIG. 14, a digital signature analysis sequence diagram illustrates the digital signature analysis sequence.

Referring now to the Key Pair Generation component of the invention, three tiers of keys are included in a preferred embodiment. The top tier is the company root key pair. The private key of this key pair is the most securely held key. The public key of this key pair is in the company root certificate. This certificate is self-signing in that it requires no other certificate authority to validate the key as authentic.

In a preferred embodiment, the second tier keys are subsidiary keys. Typically, these key pairs are controlled at the company level (as are the first tier keys). In one specific non-limiting embodiment, there are initially three subsidiary key pairs (e.g., one for each city in which the company is located). Preferably, when these keys are generated, the keys are signed using the first tier company root private key. After the second tier keys are generated, content can be signed without the need to use the root private key. However, it is still important to hold the subsidiary private keys securely, since content signed with the second tier keys are valid and could display unsecured content. Another advantage of subsidiary keys is that if a key is compromised for some reason, it will only affect that particular subsidiary key and content, not all content across all keys.

In a preferred embodiment, the third tier keys are casino keys, which are controlled by each individual casino (or other establishment utilizing the claimed invention). When these third tier keys are generated, the third tier keys are signed by a subsidiary (second tier) key. Again, it is important to keep the casino private key secure, since content signed with this key is valid. By having a third tier, any compromised casino keys only affect the machines within that casino.

Figure 15:
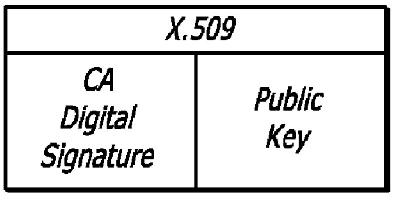
FIG. 15 illustrates a Certificates (X.509) as utilized in accordance with a preferred embodiment.

In another aspect of a preferred embodiment, X.509 certificates are used to facilitate the use of the three tier key structure. As shown in FIG. 15, a digital signature certificate (X.509) diagram illustrates the components of a digital signature certificate (X.509). The X.509 certificates contains two pieces of information: (1) the public key of the certificate, and (2) the digital signature of the Certificate Authority. To use the public key of the certificate, the Certificate Authority must first authenticate the public key. In this regard, to authenticate a certificate's public key, the Certificate Authority's public key is applied along with the certificate-stored Certificate Authority's digital signature using DSA.

Figure 16:
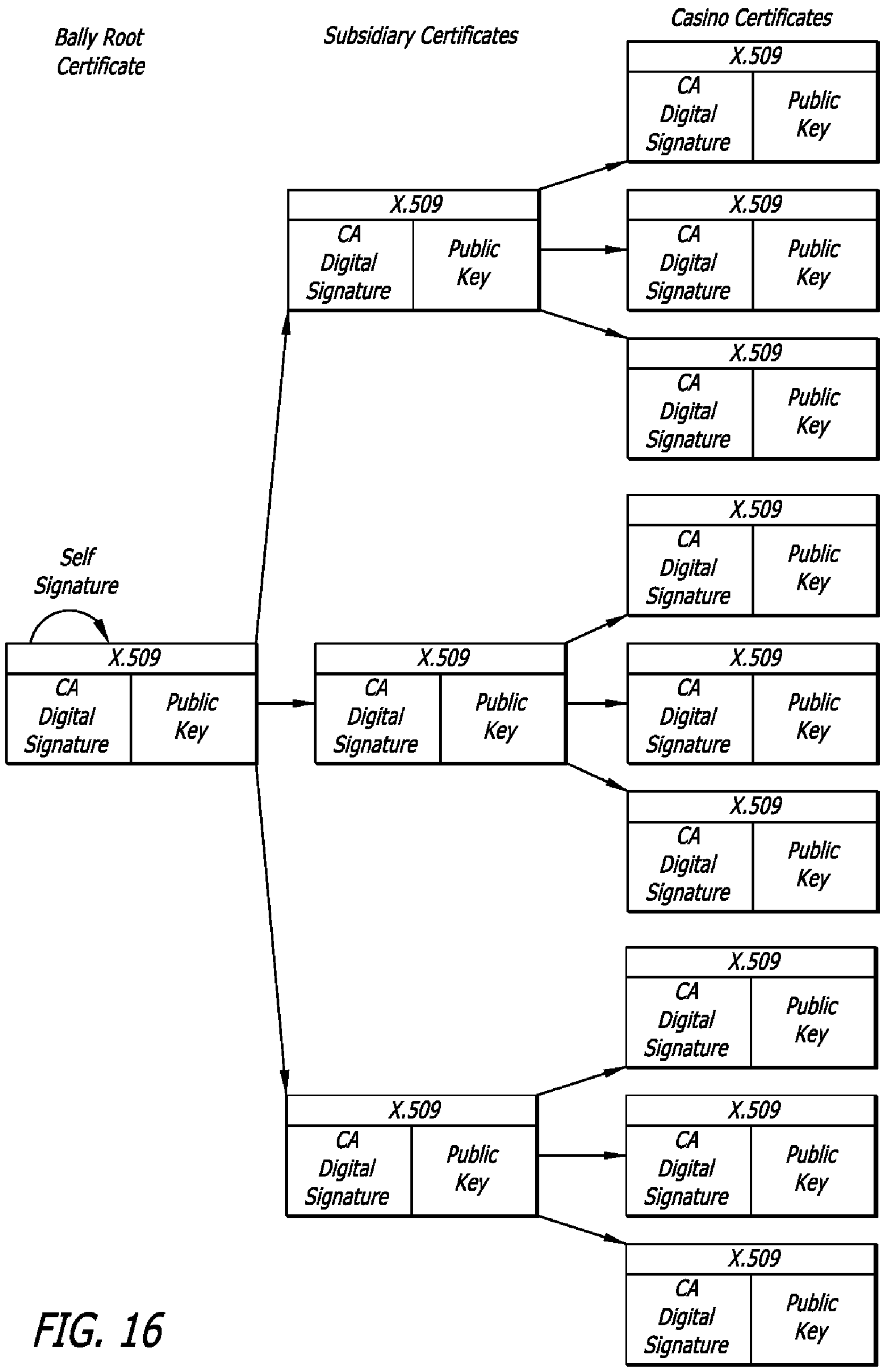
FIG. 16 illustrates a three-tiered Root Certificate structure.

As shown in FIG. 16, a digital signature certificates (X.509) diagram illustrates root, subsidiary, and casino level digital signature certificates (X.509). The root certificate is self-signing, meaning that its public key is authentic by definition. The Subsidiary (second tier) certificates have company root as its Certificate Authority. Lastly, the casino (e.g., individual establishment) certificates each have a subsidiary (second tier) certificate as its Certificate Authority.

Figure 17:
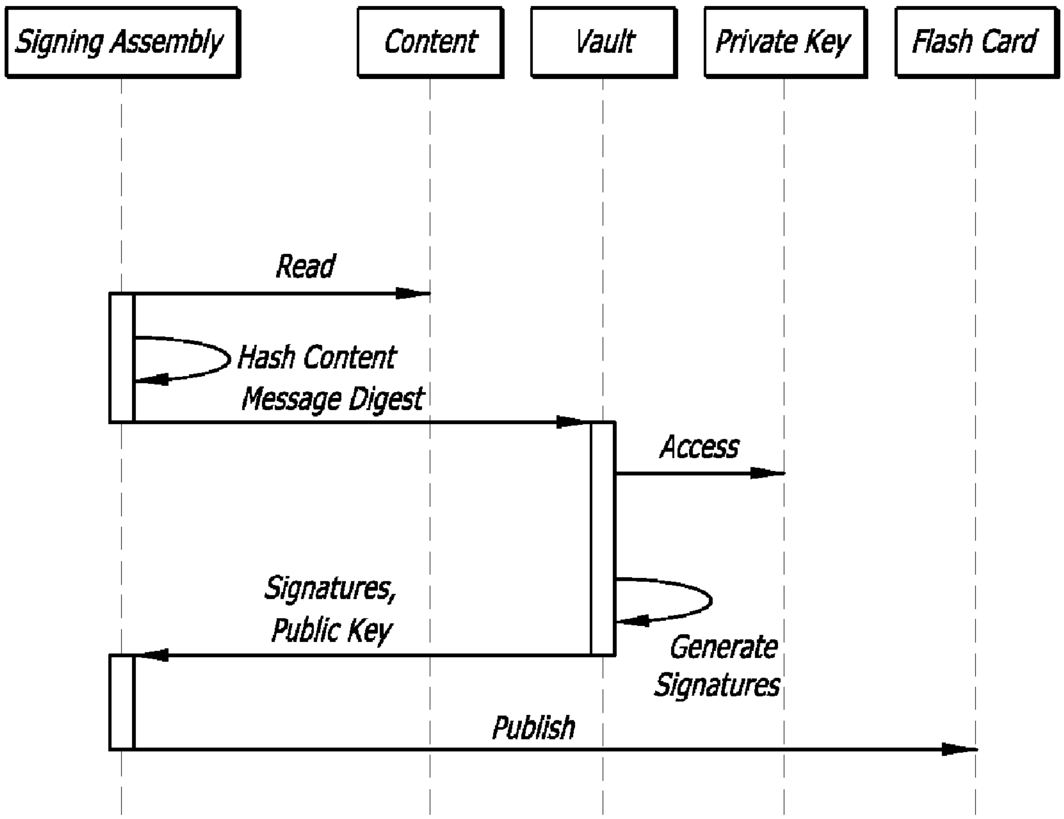
FIG. 17 is a Digital Signing Sequence Diagram that illustrates a sequence in accordance with a preferred embodiment.

Referring now to FIG. 17, a digital signing sequence diagram illustrates the digital signing sequence. With respect to the digital signing sequence, the production content is signed using the private key. Typically, the private key can only be accessed from within the vault. Furthermore, in order to facilitate vault signing, the content is first hashed into a message digest, and stored on a floppy disk (or other portable storage media). Next, the floppy disk (or other portable storage media) is taken into the vault, where the files are signed with the private key. Continuing, the digital signatures and the public key are written to the floppy disk (or other portable storage media). Lastly, the floppy disk (or other portable storage media) is then used to transfer the final files.

In another aspect of a preferred embodiment, a four-tier key structure is utilized. In such an embodiment, the first tier is the root program tier. At this first tier level, full access is granted and all system parameters may be modified. In one preferred embodiment, the second tier is the slot manager program tier. At this second tier level a somewhat reduced level of access is permitted. Preferably, the second level access enables a slot manager to add, delete, and/or modify hardware, software, games, denominations, prize awards, jackpots, wager amounts, and the like, but is not allowed to alter the operating system.

Continuing, in this preferred embodiment, the third tier is the slot technician program tier. At this second tier level an even more significantly reduced level of access is permitted. Preferably, the third level access enables a slot technician to fix tilts, jams, and other errors, as well as refill money, tickets, coupons, and/or receipts. However, in this embodiment the third tier level does not provide any of greater degrees of access described above.

Finally, in this preferred embodiment, the fourth tier is the player customization tier. At this fourth tier level no restricted access is permitted, but rather only display change type access is permitted. Preferably, the fourth level access enables a player to modify parameter including, by way of example only, and not by way of limitation: the language, color, font size, and general layout of the game presentation. Each of these four tier level keys must be signed. Importantly, all of the keys are configured to leave their own distinct audit trail.

Although the invention has been described in language specific to computer structural features, methodological acts, and by computer readable media, it is to be understood that the invention defined in the appended claims is not necessarily limited to the specific structures, acts, or media described. Therefore, the specific structural features, acts and media are disclosed as exemplary embodiments implementing the claimed invention.

Furthermore, the various embodiments described above are provided by way of illustration only and should not be construed to limit the invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. An embedded user interface system associated with a gaming machine, the gaming machine including a gaming presentation and gaming processor, the embedded user interface system comprising:

a web content capable display screen, wherein the display screen presents information to a user via the display screen;

an embedded processor that employs an internal operating system; and a dictionary extension, wherein the dictionary extension receives a text data message directed to be displayed to a player upon a display screen, translates the message into an XML, HTML, or DHTML enhanced player message directed to be displayed to the player upon the display screen, and initiates a command that launches a pop-up dialog box over a browser presented on the display screen without altering the browser presented on the display screen;

wherein the pop-up dialog box enables a temporary message to be sent to a user without changing a state of the browser behind the pop-up dialogue box.

2. The embedded user interface of claim 1, wherein the incoming data is a serial communication message.

3. The embedded user interface of claim 1, wherein the embedded processor communicates with the gaming processor over an I2C bus.

4. The embedded user interface of claim 1, wherein the web content capable display screen is a color graphic touch screen display.

5. The embedded user interface of claim 1, wherein the embedded processor is at least a 32-bit processor.

6. The embedded user interface of claim 1, wherein the internal operating system is customized to match the specific hardware to which the internal operating system attaches.

7. The embedded user interface of claim 1, wherein the embedded processor utilizes cryptographic technology.

8. The embedded user interface of claim 1, wherein the content offers a certification process for authentication and non-repudiation.

9. The embedded user interface of claim 1, wherein the certification process provides auditability and traceability.

10. The embedded user interface of claim 1, wherein the certification process provides sufficient security for gaming regulators to allow casino operators to design their own content.

11. The embedded user interface of claim 1, wherein the embedded enhanced user interface connects to an Ethernet-networked backbone.

12. The embedded additional user interface of claim 1, wherein the embedded enhanced user interface connects to a web server through an Ethernet-networked backbone.

13. An embedded user interface system for use in a gaming machine, the gaming machine including a gaming presentation and gaming processor, the embedded user interface system comprising:
- a web content capable display screen, wherein the display screen presents information to a user via the display screen;
- a dictionary extension, wherein the dictionary extension receives an incoming text data message directed to be displayed to a player upon a display screen, and translates the message into an XML, HTML, or DHTML enhanced player message directed to be displayed to the player upon the display screen; and
- an embedded processor that employs an internal operating system and communicates with the gaming processor, wherein the embedded processor reads an incoming text data message sent from a game monitoring unit to the player, calls the dictionary component, returns a set of actions upon which a display manager performs, and displays the enhanced player message to the player on the display screen.

14. The embedded user interface of claim 1, wherein the incoming data is a serial communication message.

15. The embedded user interface of claim 13, wherein the embedded processor communicates with the gaming processor over an I2C bus.

16. The embedded user interface of claim 13, wherein the animation capable display screen is a color graphic touch screen display.

17. The embedded user interface of claim 13, wherein the embedded processor is at least a 32-bit processor.

18. The embedded user interface of claim 13, wherein the internal operating system is customized to match the specific hardware to which the internal operating system attaches.

19. The embedded user interface of claim 13, wherein the embedded processor utilizes cryptographic technology.

20. The embedded user interface of claim 13, wherein the content offers a certification process for authentication and non-repudiation.

21. The embedded user interface of claim 13, wherein the certification process produces signed content that is auditable and traceable.

22. The embedded user interface of claim 13, wherein the certification process provides sufficient security for gaming regulators to allow casino operators to design their own content.

23. The embedded user interface of claim 13, wherein the embedded enhanced user interface connects to an Ethernet-networked backbone.

24. The embedded user interface of claim 13, wherein the embedded enhanced user interface connects to a web server through an Ethernet-networked backbone.

25. An embedded user interface system for use in a gaming machine, the gaming machine including a gaming presentation and gaming processor, the embedded user interface system comprising:
- a web page display screen, wherein the display screen presents information to a player via the display screen, and wherein the web page display screen is divided into a plurality of frames that are each capable of displaying a different uniform resource locator;
- an embedded processor that employs an internal operating system; and
- a dictionary extension, wherein the dictionary extension receives an incoming text data message directed to be displayed to a player upon a display screen, translates the message into an XML, HTML, or DHTML enhanced player message directed to be displayed to the player upon the display screen, and initiates a command that launches a pop-up dialog box over a browser presented on the display screen without altering the browser presented on the display screen;
- wherein the pop-up dialog box enables a temporary message to be sent to a player without changing a state of the browser behind the pop-up dialogue box.

26. The embedded user interface of claim 25, wherein the incoming data is a serial communication message.

27. The embedded user interface of claim 25, wherein the embedded processor communicates with the gaming processor over an I2C bus.

28. The embedded user interface of claim 25, wherein the web page display screen is a color graphic touch screen display.

29. The embedded user interface of claim 25, wherein the embedded processor is at least a 32-bit processor.

30. The embedded user interface of claim 25, wherein the internal operating system is customized to match the specific hardware to which the internal operating system attaches.

31. The embedded user interface of claim 25, wherein the embedded processor utilizes cryptographic technology.

32. The embedded user interface of claim 25, wherein the content offers a certification process for authentication and non-repudiation.

33. The embedded user interface of claim 25, wherein the certification process provides auditability and traceability.

34. The embedded additional user interface of claim 25, wherein the certification process provides sufficient security for gaming regulators to allow casino operators to design their own content.

35. The embedded user interface of claim 25, wherein the web authoring language is HTML.

36. The embedded user interface of claim 25, wherein the web authoring language is DHTML.

37. The embedded user interface of claim 25, wherein the web authoring language is XML.

38. The embedded user interface of claim 25, wherein the embedded enhanced user interface connects to an Ethernet-networked backbone.

39. The embedded user interface of claim 25, wherein the embedded enhanced user interface connects to a web server through an Ethernet-networked backbone.

40. A gaming machine having a gaming presentation, the gaming machine comprising:
- a gaming processor; and
- a user interface separate from the gaming presentation, the user interface comprising:
  - a web page display screen, wherein the display screen presents information to a user via the display screen;
  - a dictionary extension, wherein the dictionary extension receives an incoming text data message directed to be displayed to a player upon a display screen, and translates the message into an XML, HTML, or DHTML enhanced player message directed to be displayed to the player upon the display screen; and an embedded processor that employs an internal operating system and communicates with the gaming processor, wherein the embedded processor reads an incoming text data message sent from a game monitoring unit to the player, calls the dictionary component, returns a set of actions upon which a display manager performs, and displays the enhanced player message to the player on the web page display screen.

41. A method for increasing user excitement relating to a gaming machine by providing a richer gaming experience via an embedded user interface system that is incorporated into the gaming machine, wherein the embedded user interface system includes an embedded processor, a web page display screen, and a dictionary extension, the method comprising:

receiving an incoming text data message directed to be displayed to a player upon a web content capable display screen of the embedded user interface system;

translating the message into an XML, HTML, or DHTML enhanced player message directed to be displayed to the player upon the web content capable display screen using the embedded processor and the dictionary extension; and initiating a command that launches a pop-up dialog box over a browser presented on the web content capable display screen without altering the browser presented on the web content capable display screen;

wherein the pop-up dialog box enables a temporary message to be sent to a user without changing a state of the browser behind the pop-up dialogue box.

42. A gaming machine that includes an embedded user interface system for use in a gaming machine, the gaming machine including a gaming presentation and gaming processor, the embedded user interface system comprising:

a web content capable display screen, wherein the display screen presents information to a user via the display screen, wherein the web content display screen is separate from the gaming presentation of the gaming machine;

an embedded processor that employs an internal operating system; and a dictionary extension, wherein the dictionary extension receives a text data message directed to be displayed to a player upon a display screen, translates the message into an XML, HTML, or DHTML enhanced player message directed to be displayed to the player upon the display screen, and initiates a command that launches a pop-up dialog box over a browser presented on the display screen without altering the browser presented on the display screen;

wherein the pop-up dialog box enables a temporary message to be sent to a user without changing a state of the browser behind the pop-up dialogue box.

* * * * *

UNITED STATES PATENT AND TRADEMARK OFFICE

CERTIFICATE OF CORRECTION

PATENT NO. : 7,905,780 B2
APPLICATION NO. : 11/307528
DATED : March 15, 2011
INVENTOR(S) : Morrow et al.

It is certified that error appears in the above-identified patent and that said Letters Patent is hereby corrected as shown below:

Column 5
Line 30, change "press" to --pressed--

Column 10
Line 50, delete the words "and highly" after the word "further,"

Column 10
Line 51, delete the word "advantageously,"

Column 17
Line 24, change "driver" to --drivers--

Signed and Sealed this
Twenty-fourth Day of May, 2011

David J. Kappos
*Director of the United States Patent and Trademark Office*